US011480382B2

(12) United States Patent
Seong et al.

(10) Patent No.: US 11,480,382 B2
(45) Date of Patent: Oct. 25, 2022

(54) REFRIGERATOR

(71) Applicant: LG ELECTRONICS INC., Seoul (KR)

(72) Inventors: Giseok Seong, Seoul (KR); Jeongwon Park, Seoul (KR); Myungjin Chung, Seoul (KR); Kyungseok Kim, Seoul (KR); Tackwon Han, Seoul (KR); Jinho Kim, Seoul (KR); Yonghun Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 16/725,071

(22) Filed: Dec. 23, 2019

(65) Prior Publication Data
US 2020/0224951 A1 Jul. 16, 2020

(30) Foreign Application Priority Data

Jan. 10, 2019 (KR) .................. 10-2019-0003592
Jan. 11, 2019 (KR) .................. 10-2019-0004152

(51) Int. Cl.
F25D 17/06 (2006.01)
F25D 23/02 (2006.01)
(Continued)

(52) U.S. Cl.
CPC ............ *F25D 11/022* (2013.01); *F25B 47/02* (2013.01); *F25D 23/025* (2013.01); *F25D 23/04* (2013.01);
(Continued)

(58) Field of Classification Search
CPC ...... F25D 11/022; F25D 23/025; F25D 23/04; F25D 2317/0682
See application file for complete search history.

(56) References Cited

U.S. PATENT DOCUMENTS 5,031,413 A * 7/1991 Tsuihiji ................. F25D 21/002
62/234
5,228,499 A 7/1993 Yoon
(Continued)

FOREIGN PATENT DOCUMENTS

CN 1061845 6/1992
CN 1247968 3/2000
(Continued)

OTHER PUBLICATIONS

Refrigerant Pump-Down Method, HVAC Refrigeration, High Performance HVAC, Oct. 18, 2016 (Year: 2021).*
(Continued)

*Primary Examiner* — Christopher R Zerphey
*Assistant Examiner* — Bejeir Brooks
(74) *Attorney, Agent, or Firm* — Ked & Associates, LLP

(57) ABSTRACT

A refrigerator includes a cabinet configured to form a first storage chamber and a second storage chamber, a first evaporator configured to cool the first storage chamber, a first fan configured to circulate air in the first storage chamber to the first evaporator and the first storage chamber, a second evaporator configured to cool the second storage chamber, a compressor configured to be connected to the first evaporator and the second evaporator, a second fan configured to circulate air in the second storage chamber to the second evaporator and the second storage chamber; a refrigerant valve configured to guide refrigerant to the first evaporator or the second evaporator, and a controller configured to perform a plurality of modes sequentially to defrost the second evaporator.

23 Claims, 16 Drawing Sheets

(51) Int. Cl.
  *F25D 29/00* (2006.01)
  *F25D 31/00* (2006.01)
  *F25D 11/02* (2006.01)
  *F25D 23/04* (2006.01)
  *F25B 47/02* (2006.01)
  F25D 21/00 (2006.01)
  F25D 21/08 (2006.01)
  F25D 21/06 (2006.01)

(52) U.S. Cl.
  CPC .......... *F25D 21/002* (2013.01); *F25D 21/006* (2013.01); *F25D 21/008* (2013.01); *F25D 21/06* (2013.01); *F25D 21/08* (2013.01); *F25D 2317/0682* (2013.01); *F25D 2323/02* (2013.01); *F25D 2400/02* (2013.01); *F25D 2600/06* (2013.01); *F25D 2700/10* (2013.01); *F25D 2700/12* (2013.01)

(56) References Cited

U.S. PATENT DOCUMENTS

| | | | |
|---|---|---|---|
| 5,878,592 | A | 3/1999 | Borges et al. |
| 6,000,232 | A | 12/1999 | Witten-Hannah et al. |
| 6,058,723 | A | 5/2000 | Kusunoki et al. |
| 6,327,867 | B1 * | 12/2001 | Hyodo ............ F25B 5/04 62/187 |
| 6,694,753 | B1 * | 2/2004 | Lanz ............... F25D 21/006 62/158 |
| 7,971,443 | B2 | 7/2011 | Nishita et al. |
| 8,826,679 | B2 | 9/2014 | May et al. |
| 9,140,479 | B2 | 9/2015 | Gomes et al. |
| 9,599,353 | B2 | 3/2017 | Cur et al. |
| 10,228,180 | B2 | 3/2019 | Oyu |
| 10,655,893 | B2 | 5/2020 | Saint Pierre et al. |
| 10,677,510 | B2 | 6/2020 | Kim |
| 10,712,074 | B2 | 7/2020 | Scalf et al. |
| 10,823,481 | B2 | 11/2020 | Gomes et al. |
| 2003/0029178 | A1 | 2/2003 | Zentner et al. |
| 2004/0263038 | A1 | 12/2004 | Ribolzi |
| 2007/0000271 | A1 | 1/2007 | Lee et al. |
| 2007/0033956 | A1 * | 2/2007 | Kang ............... F25D 17/065 62/151 |
| 2007/0074528 | A1 | 4/2007 | Rodriguez |
| 2008/0000256 | A1 | 1/2008 | Shin |
| 2008/0148748 | A1 * | 6/2008 | Viegas ............... B60P 3/20 62/151 |
| 2008/0148761 | A1 | 6/2008 | Venkatakrishnan |
| 2008/0196427 | A1 | 8/2008 | Bianchi et al. |
| 2009/0015123 | A1 | 1/2009 | Lee |
| 2009/0193826 | A1 | 8/2009 | Yasugi et al. |
| 2010/0070083 | A1 * | 3/2010 | Kim ............... F25D 21/006 700/275 |
| 2010/0199709 | A1 | 8/2010 | Holland |
| 2011/0225994 | A1 | 9/2011 | Fotiadis et al. |
| 2012/0036882 | A1 | 2/2012 | Park et al. |
| 2012/0204581 | A1 | 8/2012 | Kang et al. |
| 2013/0000333 | A1 * | 1/2013 | Kim ............... F25D 25/025 62/129 |
| 2013/0174586 | A1 | 7/2013 | Kang et al. |
| 2014/0208783 | A1 | 7/2014 | Lee et al. |
| 2015/0000310 | A1 | 1/2015 | Lee et al. |
| 2015/0121918 | A1 | 5/2015 | Lee |
| 2015/0354860 | A1 | 12/2015 | Kacmaz |
| 2016/0153693 | A1 | 6/2016 | Oyu et al. |
| 2016/0273823 | A1 | 9/2016 | Cho et al. |
| 2017/0016271 | A1 | 1/2017 | Boucher |
| 2017/0188721 | A1 | 7/2017 | Park et al. |
| 2017/0219254 | A1 * | 8/2017 | Sul ............... F25B 1/10 |
| 2018/0038626 | A1 | 2/2018 | Kim et al. |
| 2018/0087814 | A1 | 3/2018 | Han et al. |
| 2018/0163748 | A1 | 6/2018 | Hayamitsu et al. |
| 2018/0299182 | A1 | 10/2018 | Besore et al. |

FOREIGN PATENT DOCUMENTS

| | | | |
|---|---|---|---|
| CN | 1367364 | | 9/2002 |
| CN | 101048633 | | 10/2007 |
| CN | 102121779 | | 7/2011 |
| CN | 103968633 | | 8/2014 |
| CN | 103033013 | | 4/2015 |
| CN | 105164478 | | 12/2015 |
| CN | 105890268 | | 8/2016 |
| CN | 108369052 | | 8/2018 |
| DE | 698 31 028 | | 5/2006 |
| DE | 10 2008 054 934 | | 7/2010 |
| EP | 1 806 553 | | 7/2007 |
| EP | 2 078 908 | | 7/2009 |
| EP | 3 190 364 | | 7/2017 |
| EP | 3 301 385 | | 4/2018 |
| EP | 3 338 041 | | 6/2018 |
| EP | 3338041 A1 * | 6/2018 | .......... F25D 17/062 |
| JP | H10-300316 | | 11/1998 |
| JP | H10-332239 | | 12/1998 |
| JP | 2000-105048 | | 4/2000 |
| JP | 2000-258028 | | 9/2000 |
| JP | 2002-039663 | | 2/2002 |
| JP | 2002-130908 | | 5/2002 |
| JP | 2002-206840 | | 7/2002 |
| JP | 2003-139454 | | 5/2003 |
| JP | 2003-322454 | | 11/2003 |
| JP | 2006-242463 | | 9/2006 |
| JP | 2009-041883 | | 2/2009 |
| JP | 2009-229018 | | 10/2009 |
| JP | 2010-071606 | | 4/2010 |
| JP | 2012-242074 | | 12/2012 |
| KR | 20-0380906 | | 4/2005 |
| KR | 10-2008-0003654 | | 1/2008 |
| KR | 10-2011-0020482 | | 3/2011 |
| KR | 10-2011-0027562 | | 3/2011 |
| KR | 10-2018-0084516 | | 7/2018 |
| WO | WO 2005/052474 | | 6/2005 |
| WO | WO 2008/120862 | | 10/2008 |
| WO | WO 2016/175562 | | 11/2016 |

OTHER PUBLICATIONS

European Search Report dated Jun. 19, 2020 issued in EP Application No. 20150256.4.
European Search Report dated May 25, 2020 issued in EP Application No. 20150244.0.
European Search Report dated May 25, 2020 issued in EP Application No. 20150245.7.
European Search Report dated May 25, 2020 issued in EP Application No. 20150248.1.
European Search Report dated May 26, 2020 issued in EP Application No. 20150246.5.
European Search Report dated May 26, 2020 issued in EP Application No. 20150251.5.
European Search Report dated May 26, 2020 issued in EP Application No. 20150252.3.
United States Office Action dated Oct. 6, 2021 issued in co-pending related U.S. Appl. No. 16/725,166.
Chinese Office Action dated Apr. 26, 2021 issued in CN Application No. 202010017928.6.
United States Office Action dated Jul. 26, 2021 issued in co-pending related U.S. Appl. No. 16/725,092.
Chinese Office Action dated May 28, 2021 issued in CN Application No. 202010018245.2.
U.S. Office Action dated Aug. 31, 2021 issued in U.S. Appl. No. 16/725,318.
Eccentrically, Merriam-Webster, https://www.merriam-webster.com/dictionary/eccentrically (Year: 2021).
What's the Difference Between a Gasket and a Seal, Aero Rubber Co., https://aerorubber.com/2020/05/28/whats-the-difference-between-a-gasket-and-a-seal/ (Year: 2021).
Chinese Office Action dated Apr. 26, 2021 issued in CN Application No. 201911393284.4.

(56) References Cited

OTHER PUBLICATIONS

Chinese Office Action dated Jul. 1, 2021 issued in Application No. 201911395312.6.
Wine Guardian®—wine cooling, split system, and calculator (2021) (Year: 2021).
U.S. Office Action dated Oct. 1, 2021 issued in U.S. Appl. No. 16/725,428.
U.S. Office Action dated Sep. 17, 2021 issued in U.S. Appl. No. 16/725,436.
United States Office Action dated Apr. 11, 2022 issued in co-pending related U.S. Appl. No. 16/725,271.
U.S. Appl. No. 16/725,166, filed Dec. 23, 2019.
United States Notice of Allowance dated Mar. 23, 2022 issued in co-pending related U.S. Appl. No. 16/725,166.
United States Office Action dated Mar. 24, 2022 issued in co-pending related U.S. Appl. No. 16/725,428.
United States Office Action dated Mar. 29, 2022 issued in co-pending related U.S. Appl. No. 16/725,551.
United States Office Action dated Feb. 15, 2022 issued in co-pending related U.S. Appl. No. 16/725,318.
Damper Definition & Meaning—Merriam-Webster, 2022 (Year: 2022).
United States Office Action dated Aug. 1, 2022 issued in co-pending related U.S. Appl. No. 16/725,271.
U.S. Appl. No. 16/725,551, filed Dec. 23, 2019.
U.S. Appl. No. 16/725,428, filed Dec. 23, 2019.
U.S. Appl. No. 16/725,436, filed Dec. 23, 2019.
U.S. Appl. No. 16/725,092, filed Dec. 23, 2019.
U.S. Appl. No. 16/725,271, filed Dec. 23, 2019.
U.S. Appl. No. 16/725,318, filed Dec. 23, 2019.
U.S. Appl. No. 16/725,071, filed Dec. 23, 2019.

* cited by examiner

REFRIGERATOR

CROSS-REFERENCE TO RELATED APPLICATION(S)

This application claims priority under 35 U.S.C. 119 and 35 U.S.C. 365 to Korean Patent Application No. 10-2019-0003592 filed on Jan. 10, 2019 and No. 10-2019-0004152 filed on Jan. 11, 2019 in Korea, the entire contents of which are hereby incorporated by reference in their entirety.

BACKGROUND

1. Field

The present disclosure relates to a refrigerator.

2. Background

In general, a refrigerator is an appliance that allows food or other goods to be stored at a relatively low temperature in an internal storage space accessed by a door.

BRIEF DESCRIPTION OF THE DRAWINGS

Embodiments will be described in detail with reference to the following drawings in which like reference numerals refer to like elements, and wherein.

DETAILED DESCRIPTION

Figure 1:
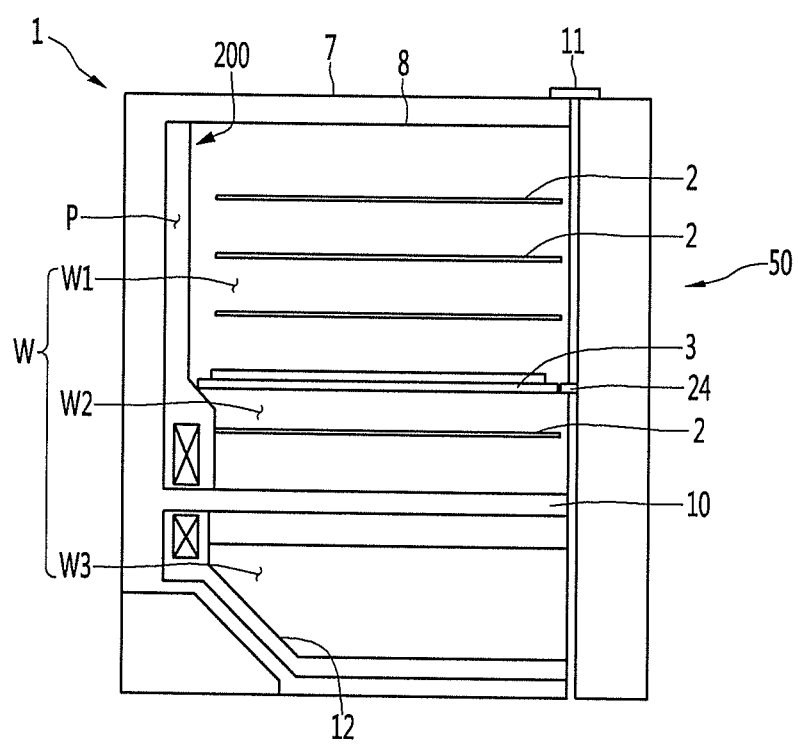
FIG. 1 is a sectional view illustrating an example of a refrigerator according to an embodiment of the present disclosure.

FIG. 1 is a sectional view illustrating an example of a refrigerator according to an embodiment of the present disclosure. The refrigerator may have a storage chamber W in which goods and the like may be stored. The refrigerator may include a cabinet 1 in which the storage chamber W is formed. The refrigerator may further include a door 50 that opens and closes the storage chamber W. The door 50 may include at least one of a rotatable door 5 and an advancing and retracting type (or drawer type) door 6. The cabinet 1 may include an outer case 7 forming an outer appearance and an inner case 8 forming at least one surface for forming the storage chamber W therein.

The storage chamber W may be a storage chamber in which certain kinds of goods which are preferably stored at a specific temperature range are stored. For example, the storage chamber W may be a dedicated storage chamber for storing certain goods that need to be kept warm or cold, for example, alcoholic liquors such as wine and beer, fermented foods, cosmetics, and medical supplies, for example. As one example, the storage chamber for wine can be maintained at a temperature of 3° C. to 20° C., or a higher temperature than the refrigerating chamber of a normal refrigerator, and may not exceed 20° C. The temperature of the storage chamber for red wine may be adjusted to 12° C. to 18° C., the temperature of the storage chamber for white wine may be adjusted to 6° C. to 11° C. Meanwhile, the temperature of the storage chamber for champagne may be adjusted to about 5° C.

The temperature of the storage chamber W may be adjusted such that the storage chamber temperature fluctuates between a target temperature upper limit value and a target temperature lower limit value of the storage chamber W. The quality of the goods stored in the storage chamber W may be reduced by the difference between the target temperature upper limit value and the target temperature lower limit value (hereinafter, referred to as storage chamber temperature difference). The refrigerator may be manufactured with a small storage chamber temperature difference according to the type of the goods and may minimize the reduction of the quality of the goods. The storage chamber W of the refrigerator of the present embodiment may be a storage chamber having a smaller storage chamber temperature difference than that of a general refrigerator. Specifically, the storage chamber temperature difference of the storage chamber W may be less than 3° C., or may be 2° C. as an example. Of course, in a case of considering goods very sensitive to temperature changes, the storage chamber temperature difference may be less than 1° C.

The refrigerator may include a device capable of adjusting the temperature of the storage chamber W (hereinafter, referred to as a "temperature adjusting device"). The temperature adjusting device may include at least one of cooling device and heating device. The temperature adjusting device may cool or heat the storage chamber W by at least one of conduction, convection, and radiation. For example, a cooling device such as an evaporator 150 or a heat absorbing body of a thermoelectric element may be attached to the inner case 8 to cool the storage chamber W by conduction. By adding an airflow forming mechanism such as a fan, the air heat-exchanged with the cooling device by convection can be supplied to the storage chamber W.

A heating device such as a heater or a heat generating body of the thermoelectric element may be attached to the inner case 8 to heat the storage chamber W by conduction. The addition of an airflow forming mechanism such as a fan may supply heat to the storage chamber W by convection. In the present specification, the cooling device may be defined as a device capable of cooling the storage chamber W, including at least one of the evaporator 150, the heat absorbing body of the thermoelectric element, and the fan. In addition, the heating device may be defined as a device capable of heating the storage chamber W, including at least one of a heater, a heat generating body of the thermoelectric element, and a fan.

The refrigerator may further include an inner guide 200. The inner guide 200 may partition an inner portion of the inner case 8 into a space in which goods are stored and a space in which a temperature adjusting device is located (hereinafter referred to as a "temperature adjusting device chamber"). The temperature adjusting device chamber may be a cooling device chamber and a heating device chamber.

For example, the temperature adjusting device chamber may be located between the inner guide 200 and the inner case 8, between the inner guide 200 and the outer case 7, or inside the inner guide 200. The inner guide 200 may partition a cold air flow path P for supplying cold air to the space where goods are stored and the storage chamber W, and at least one of the cooling device may be provided in the cold air flow path P.

The inner guide 200 may partition a space in which goods are stored and a hot air flow path P for supplying heat to the storage chamber W, and at least one of the heating device may be arranged in the hot air flow path P. The inner guide for the cooling device and the inner guide for the heating device may be designed in common and may be manufactured separately. The inner guide 200 may form a storage space together with the inner case 8. The inner guide 200 may be provided in front of the rear body of the inner case.

The refrigerator may include both a refrigerator having one space having the same storage chamber temperature range of the storage chamber W and a refrigerator having two or more spaces having different storage temperature ranges from each other.

The refrigerator may further include a partition member 3 arranged vertically or horizontally in order to divide the storage chambers W into two or more spaces (for example, a first space W1 and a second space W2) which may have different storage chamber temperatures range from each other. The refrigerator may further include the partition member 10 arranged vertically or horizontally in order to divide the storage chambers W into two or more spaces (for example, a second space W2, a third space W3) which have different storage chamber temperature ranges from each other. The partition member 10 may be separately manufactured and then mounted in the inner case 8. The partition member 10 may be manufactured by foaming together with a heat insulating material provided between the outer case 7 and the inner cases 8 and 9.

The two or more spaces may be different in size. For example, the first space W1 may be located at the upper side, the second space W2 may be located at the lower side, and the partition member 3 may be arranged so that the size of the first space W1 is larger than the size of the second space W2. The first storage chamber temperature for the first space W may be higher than the second storage chamber temperature for the second space W2.

According to an embodiment, the first storage chamber temperature may be higher than the second storage chamber temperature, the maximum value of the first storage chamber temperature may be greater than the maximum value of the second storage chamber temperature, the average value of the first storage chamber temperature may be greater than the average value of the second storage chamber temperature, and the minimum value of the first storage chamber temperature may be greater than the minimum value of the second storage chamber temperature. The refrigerator may further include a door (hereinafter, a see-through door) through which the user can see the storage chamber through a see-through window without opening the door 50 from the outside of the refrigerator, and the see-through door will be described later.

The refrigerator may further include a transparent gasket 24 provided on at least one of the see-through door and the partition members 3 and 10. When the see-through door closes the storage chamber W, the transparent gasket 24 may partition the storage chamber W into two or more spaces having different storage temperature ranges from each other together with the partition members 3 and 10.

The refrigerator may further include door opening modules 11 and 11' for forcibly opening the door 50. The door opening modules 11 and 11' may be a rotatable door opening module 11 which can allow the door 5 to be rotated more than a predetermined angle without the user holding the door 5, or an advancing and retracting type door opening module 11' which can allow the door 6 to be advanced and retracted in a front and rear direction. The door opening modules 11 and 11' will be described later. The refrigerator may further include a lifting module 13 capable of lifting or lowering the holder 12, and although not illustrated in FIG. 1, the lifting module may be located in at least one of the storage chamber and the door.

The refrigerator may include a plurality of doors for opening and closing two or more spaces having different storage temperature ranges from each other. At least one of the plurality of doors may be a see-through door. At least one of the cabinet 1 or the plurality of doors may include door opening modules 11 and 11'. A lifting module 13 for lifting and lowering the holder 12 located in the storage chamber to open and close may be provided on at least one of the plurality of doors. For example, the door for the storage chamber located at the top may be a see-through door, and a lifting module 13 for lifting and lowering the holder of the storage chamber located at the lower portion may be disposed.

Figure 2:
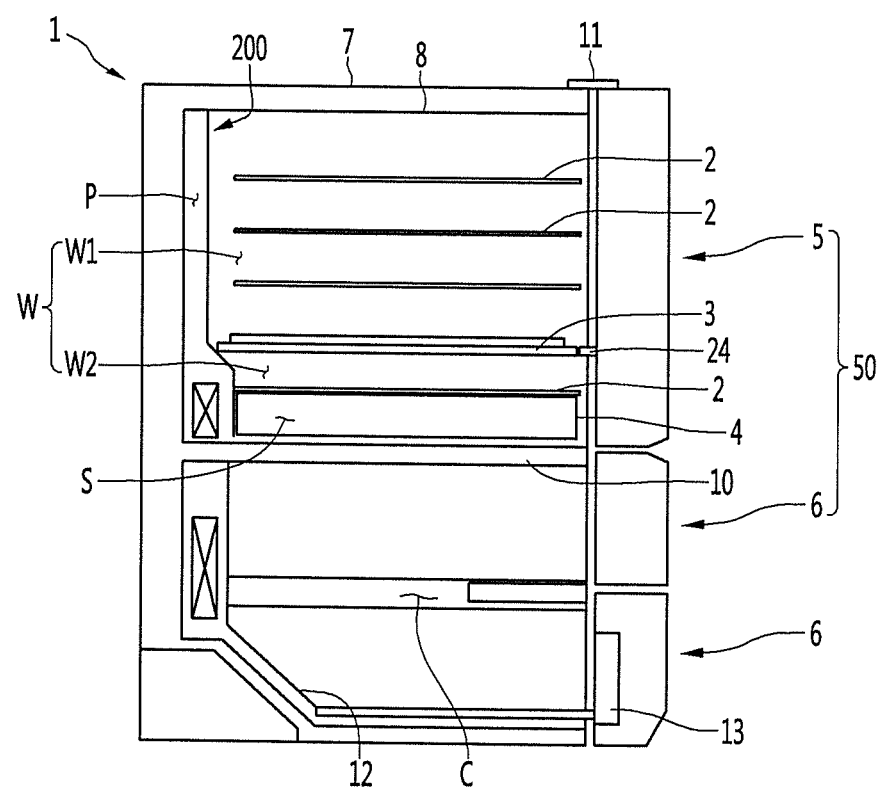
FIG. 2 is a sectional view illustrating another example of a refrigerator according to an embodiment of the present disclosure.

FIG. 2 is a sectional view illustrating another example of a refrigerator according to an embodiment of the present disclosure. Hereinafter, the storage chamber W illustrated in FIG. 1 will be described as a first storage chamber W. The refrigerator may further include at least one first storage chamber W and at least one second storage chamber C that may be temperature-controlled independently of the first storage chamber W. Hereinafter, a detailed description of the same configuration and operation as those of the storage chamber W illustrated in FIG. 1 will be omitted for the first storage chamber W, and a different configuration and operation from the storage chamber W illustrated in FIG. 1 will be described.

The second storage chamber C may be a storage chamber having a temperature range lower than the temperature range of the first storage chamber W, and for example, may be a storage chamber having a temperature range of −24° C. to 7° C. and the second storage chamber C may be a storage chamber which is temperature-controlled based on a target temperature, which is a temperature selected by a user within a temperature range of −24° C. to 7° C.

The second storage chamber C may be composed of a switching chamber (or a temperature changing chamber) in which any one of a plurality of temperature ranges may be selected, and may be configured as a non-switching chamber having one temperature range. The switching chamber may be a storage chamber which can be temperature-controlled to a selected temperature range among a plurality of temperature ranges, and the plurality of temperature ranges may include a first temperature range above zero, a second temperature range below zero, and a third temperature range between the first temperature range and the second temperature range.

For example, the user may supply an input to an input unit to select the second storage chamber C as a mode (for example, a refrigerating chamber mode) that is a temperature range above zero, and the temperature range of the second storage chamber C may be selected within a temperature range above zero (for example, 1° C. to 7° C.). The user may supply an input to an input unit to further input a desired temperature in the temperature range above zero, and the target temperature of the second storage chamber C may be a specific temperature (for example, 4° C.) entered by a user in the temperature range (for example, 1° C. to 7° C.) above zero.

The user may supply an input to the input unit and thus select as a mode in which the second storage chamber C is in the temperature range below zero (for example, freezing chamber mode) or a special mode (for example, a mode for storing a certain kind of goods or kimchi storage mode). The first storage chamber W may be a specific goods storage chamber in which a particular kind of goods which is preferably stored at a specific temperature range is stored or mainly a certain kind of goods are stored, and the second storage chamber C may be a non-specific goods storage chamber in which a various kinds of goods may be stored in addition to a specific kind of goods.

Examples of specific goods may include alcoholic beverages including wine, fermented foods, cosmetics, and medical supplies. For example, the first storage chamber W may be a storage chamber in which wine is stored or a wine chamber in which wine is mainly stored, and the second storage chamber C may be a non-wine chamber in which goods other than wine are stored or goods other than wine are mainly stored.

A storage chamber having a relatively small storage chamber temperature difference among the first storage chamber W and the second storage chamber C may be defined as a constant temperature chamber, and a storage chamber having a relatively large storage chamber temperature difference among the first storage chamber W and the second storage chamber C may be defined as a non-constant temperature chamber. Any one of the first storage chamber W and the second storage chamber C may be a priority storage chamber which is controlled in priority, and the other may be a subordinate storage chamber which is controlled secondarily to the priority chamber.

The first goods having a large or expensive quality change according to the temperature change may be stored in the priority storage chamber, and the second goods having a small or low quality change according to the temperature change may be stored in the subordinate storage chamber. The refrigerator may perform a specific operation for the priority storage chamber and a specific operation for the subordinate storage chamber.

The specific operation may include a general operation and a special operation for the storage chamber. A general operation may be defined as a conventional cooling operation for the storage chamber cooling. The special operation may be defined as a defrost operation for defrosting cooling device, a door load response operation that can be performed when predetermined conditions are satisfied after the door is opened, and an initial power supply operation, which is an operation when the power is first supplied to the refrigerator.

The refrigerator may be controlled such that a specific operation for the priority storage chamber is performed first when two operations may be performed simultaneously. Here, the simultaneous operation may be defined in a case where the start condition of the first operation and the start condition of the second operation are satisfied at the same time, as a case where the start condition of the first operation is satisfied and thus the start condition of the second operation is satisfied while the first operation is in progress, and as a case where the start condition of the second operation is satisfied and thus the start condition of the first operation is satisfied while the second operation is in progress.

For example, in the refrigerator, the priority storage chamber may be cooled or heated prior to the subordinate storage chamber when the temperature of the priority storage chamber is not satisfied and the temperature of the subordinate storage chamber is not satisfied. While the cooling device for cooling the subordinate storage chamber is defrosted, if the temperature of the priority storage chamber is not satisfied, the priority storage chamber may be cooled or heated while the cooling device of the subordinate storage chamber is defrosted.

If the temperature of the priority storage chamber is not satisfied while the subordinate storage chamber is in progress of the door load response operation, the priority storage chamber may be cooled or heated during the door load response operation of the subordinate storage chamber. Any one of the first storage chamber W and the second storage chamber C may be a storage chamber in which the temperature is adjusted by the first cooling device and the heating device, and the other may be a storage chamber in which the temperature is adjusted by the second cooling device.

In the refrigerator, a separate receiving member 4 may be additionally disposed in at least one of the first space W1 and the second space W2. In the receiving member 4, a separate space S (hereinafter, referred to as a receiving space) may be formed separately from the first space W1 and the second space W2 to accommodate goods. The refrigerator may adjust the receiving space S of the receiving member 4 to a temperature range different from that of the first space W1 and the second space W2.

The receiving member 4 may be located in the second space W2 located below the first space W1. The receiving space S of the receiving member 4 may be smaller than the second space W2. The storage chamber temperature of the receiving space S may be equal to or less than the storage chamber temperature of the second space W2.

In the refrigerator, in order to dispose as many shelves 2 as possible in the first storage chamber W, the length of the refrigerator itself in the vertical direction may be longer than the width in the horizontal direction, and in this case, the length of the refrigerator in the vertical direction may be more than twice the width in the horizontal direction. Since the refrigerator may be rolled over if the length in the vertical direction is too long relative to the width in the horizontal direction, the length in the vertical direction may be less than three times the width in the horizontal direction.

Preferred examples of the length in the vertical direction that can store a plurality of the specific goods may be 2.3 to 3 times the width in a left and right direction, and the most preferred example may be 2.4 to 3 times the width in the left and right direction. Even if the length of the refrigerator in the vertical direction is longer than the width in the left and right direction, in a case where the length of the storage chamber in which the specific goods are substantially stored, for example, the first storage chamber W, in the vertical direction is short, the number of specific goods may not be high. In the refrigerator, the length of the first storage chamber W in the vertical direction may be longer than the length of the second storage chamber C in the vertical direction so that a space for the specific goods may be as large as possible. For example, the length of the first storage chamber W in the vertical direction may be 1.1 times to 1.5 times the length of the second storage chamber C in the vertical direction.

At least one of the first door 5 and the second door 6 may be a see-through door, and the see-through door will be described later. The refrigerator may further include door opening modules 11 and 11' for forcibly opening at least one of the first door 5 and the second door 6 to the door opening modules 11 and 11', and the door opening modules 11 and 11' will be described later. In at least one of the first storage chamber W, the second storage chamber C, and the first door 5 and the second door 6, a lifting module 13 capable of lifting the holder 12 may be provided, and the lifting module 13 will be described later.

Figure 3:
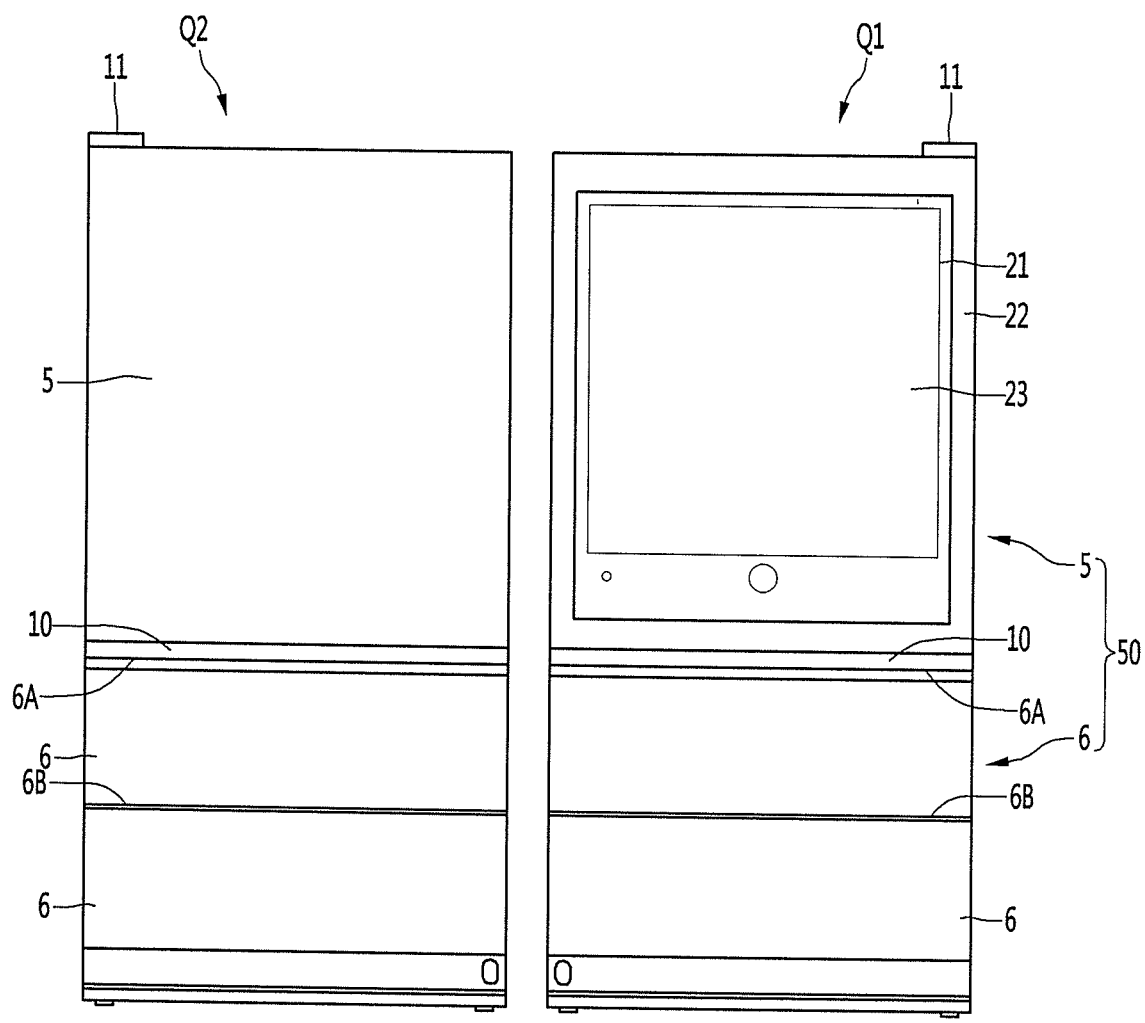
FIG. 3 is a front view when a refrigerator according to an embodiment of the present disclosure is disposed adjacent to another refrigerator.

Referring to FIG. 3, the refrigerator of the present embodiment may be provided adjacent to other refrigerators. A pair of adjacent refrigerators may be provided in the left and right direction, hereinafter, for convenience of description, the first refrigerator Q1 and the second refrigerator Q2 will be referred for description thereof, and the same configuration of the first refrigerator Q1 and the second refrigerator Q2 as each other will be described using the same reference numerals for convenience of description. In the refrigerator of the present embodiment, a plurality of storage chambers may be located in the left and right direction and the vertical direction in one outer case, such as a side by side type refrigerator or a French door type refrigerator.

At least one of the first refrigerator Q1 and the second refrigerator Q2 may be a refrigerator to which an embodiment of the present disclosure is applied. Although the first refrigerator Q1 and the second refrigerator Q2 have some functions different from each other, the lengths of the first and second refrigerators Q1 and Q2 in the vertical direction may be the same or almost similar so that the overall appearance may give the same or similar feeling when arranged adjacent to each other in the left and right direction.

Each of the first refrigerator Q1 and the second refrigerator Q2 may include each of a first storage chamber and a second storage chamber, and the first storage chamber and the second storage chamber may include a partition member 10 partitioning in the vertical direction, respectively. The partition member 10 of the first refrigerator Q1 and the partition member 10 of the second refrigerator Q2 may overlap in the horizontal direction.

The lower end 6A of the second door 6 opening and closing the second storage chamber of the first refrigerator Q1 and the lower end 6A of the second door 6 opening and closing the second storage chamber of the second refrigerator Q2 may coincide with each other in the horizontal direction. The lower end 6B of the second door 6 opening and closing the second storage chamber of the first refrigerator Q1 and the lower end 6B of the second door 6 opening and closing the second storage chamber of the second refrigerator Q2 may coincide with each other in the horizontal direction.

Figure 4:
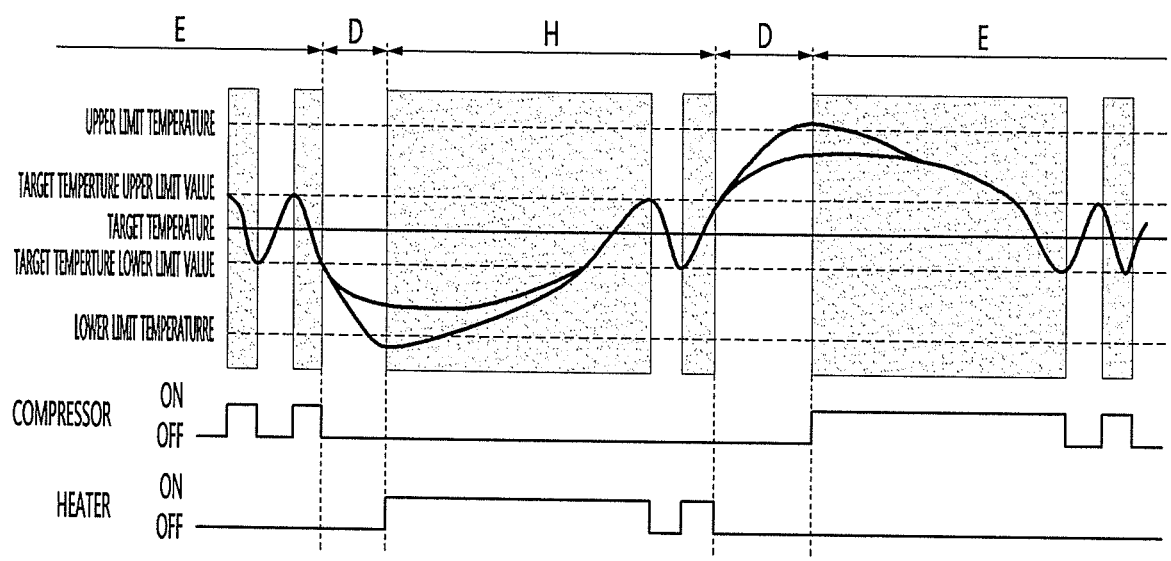
FIG. 4 is a view illustrating on and off of cooling device and on and off of heating device according to the temperature change of the storage chamber according to an embodiment of the present disclosure.

Referring to FIG. 4, the refrigerator may include cooling device and heating device that may be independently controlled to control the temperature of the storage chamber W. The refrigerator may include cooling device and heating device for controlling the temperature of at least one storage chamber among a specific goods storage chamber, a constant temperature chamber, and a priority storage chamber.

The refrigerator may perform a cooling operation E in which the storage chamber W is cooled by the cooling device or a heating operation H in which the storage chamber W is heated by the heating device, for temperature control of the storage chamber W. The refrigerator may implement a standby mode D that maintains the storage chamber W in a current state without cooling or heating.

The refrigerator may include a temperature sensor that senses a temperature of the storage chamber W and may perform the cooling operation E, the heating operation H, and the standby mode D according to the storage chamber temperature sensed by the temperature sensor.

The cooling operation E is not limited to that the storage chamber W is continuously cooled by the cooling device and may include a case where the storage chamber is cooled by the cooling device as a whole, but the storage chamber W is temporarily not cooled by the cooling device and a case where the storage chamber W is cooled by the cooling device as a whole, but the storage chamber is temporarily heated by the heating device. The cooling operation E may include a case where the time when the storage chamber is cooled by the cooling device is longer than the time when the storage chamber W is not cooled by the cooling device.

The heating operation H is not limited to the storage chamber W being continuously heated by the heating device and include a case where the storage chamber W is heated by the heating device as a whole, but the storage chamber W is temporarily not heated by the heating device and a case where the storage chamber W is heated by the heating device as a whole, the storage chamber W is temporarily cooled by the cooling device. The heating operation H may include a case where the time when the storage chamber W is heated by the heating device is longer than the time when the storage chamber W is not heated by the heating device.

There is a case where the temperature of the storage chamber W, which has been temperature-controlled by the cooling operation E, may be kept below a target temperature lower limit value without lifting above the target temperature lower limit value for a long time in a state of being lowered below the target temperature lower limit value.

In this case, the refrigerator may start the heating operation H so that the storage chamber W is not overcooled when the storage chamber temperature falls below the lower limit temperature, and the heating device may be turned on. The lower limit temperature may be a temperature set to be lower than the target temperature lower limit value by the predetermined temperature.

The refrigerator may start the heating operation H so that the storage chamber temperature is not maintained in a low state for a long time when the storage chamber temperature is maintained between the target temperature lower limit value and the lower limit temperature during the setting time. The heating operation H may be started when the storage chamber temperature is less than the lower limit temperature, and the lower limit temperature may be the heating operation start temperature.

One example of the standby mode D may be a mode in which the storage chamber temperature is maintained between the target lower limit value and the lower limit temperature, the refrigerator is not immediately switched to the heating operation H during the cooling operation E, and the cooling operation E, the standby mode D, and the heating operation H in that order may be controlled.

The temperature of the storage chamber W, which has been temperature-controlled by the heating operation H, may be kept above the target temperature upper limit value without being lowered below the target temperature upper limit value for a long time in a state of lifting above the target temperature upper limit value. In this case, when the storage chamber temperature exceeds the upper limit temperature, the refrigerator may start the cooling operation E so that the storage chamber W is not overheated, and the cooling device may be turned on. The upper limit temperature may be a temperature set to be higher than a target temperature upper limit value.

The refrigerator may start the cooling operation E so that the storage chamber temperature does not remain high for a long time when the storage chamber temperature is maintained between the target temperature upper limit value and the upper limit temperature during the setting time. The cooling operation E may be started when the storage chamber temperature exceeds the upper limit temperature, and the upper limit temperature may be a cooling operation start temperature.

Another example of the standby mode D may be a mode in which the storage chamber temperature is maintained between the target temperature upper limit value and the upper limit temperature, and the refrigerator may not immediately switch to the cooling operation E during the heating operation H, but the heating operation H, the standby mode D, and the cooling operation E in that order may be controlled. For example, the cooling operation E may be a mode in which the refrigerant passes through the evaporator, the air in the storage chamber W is cooled by the evaporator, and then flows into the storage chamber W.

In the cooling operation E, the compressor may be turned on or off according to the temperature of the storage chamber W. In the cooling operation E, the compressor may be turned on or off such that the storage chamber temperature is maintained between the target temperature upper limit value and the target temperature lower limit value. The compressor may be turned on because the cooling is not satisfied when the storage chamber temperature reaches the target temperature upper limit value and may be turned off when cooling is satisfied when the storage chamber temperature reaches the target temperature lower limit value.

The cooling operation E may include a cooling mode in which the refrigerant passes through the evaporator and the fan supplies heat exchanged air with the evaporator to the storage space, and a non-cooling mode in which the refrigerant does not pass through the evaporator, and when the storage chamber temperature lifts and lowers repeatedly between the upper limit temperature and the lower limit temperature in the cooling operation E, the cooling mode and the non-cooling mode may be alternately performed.

For example, in the heating operation H, the heater may be turned on or off so that the storage chamber temperature is maintained between the target temperature upper limit value and the target temperature lower limit value. Specifically, the heater may be turned off because heating is satisfied when the storage chamber temperature reaches the target temperature upper limit value and may be turned on because heating is not satisfied when the storage chamber temperature reaches the target temperature lower limit value.

The heating operation H may include a heating mode in which the refrigerant does not pass through the evaporator and the heater is turned on, and a non-heating mode in which the refrigerant does not pass through the evaporator and the heater is turned off, and in the heating operation H, when the storage chamber temperature repeats the lifting and lowering between the upper limit temperature and the lower limit temperature, the heating mode and the non-heating mode may be performed alternately.

For example, the standby mode D may be a mode in which the refrigerant does not pass through the evaporator and the heater maintains the off state. The standby mode D may be a mode in which air in the storage chamber W is not circulated by the storage chamber fan. The standby mode D may be a mode in which the heater also maintains the off state while the compressor maintains the off state.

The refrigerator may perform a humidification mode to increase the humidity of the storage chamber. The humidification mode may be a mode in which air in the storage chamber W may be humidified by flowing into the cooling device chamber by a fan, and the humidified air may flow into the storage chamber W to humidify the storage chamber, in a state where at least a portion of the cooling device is in an off state (for example, the supply of refrigerant to the evaporator is interrupted, the thermoelectric element is turned off), and at least some of the heating device is maintained in an off state (for example, the heater is turned off and the thermoelectric element is turned off).

For example, the humidification mode may be a mode in which the air in the storage chamber flows to the evaporator by a fan to be humidified, and the humidified air flows into the storage chamber to humidify the storage chamber, in a state where the heater is maintained in an off state while the refrigerant does not pass through the evaporator. In the humidification mode, a fan that circulates air in the storage chamber to the evaporator and the storage chamber may be driven.

The refrigeration cycles illustrated in FIGS. 5 to 8 may be applied to a refrigerator having three spaces (hereinafter, referred to as 1, 2, and 3 spaces) having different storage temperature ranges from each other. For example, The refrigeration cycles may be applied to at least one of i) a refrigerator having a first space W1, a second space W2, and a third space W3, ii) a refrigerator having a first storage chamber W having the first space W1 and the second space W2, and a second storage chamber C partitioned from the first storage chamber W, and iii) a refrigerator having a first storage chamber W and two second and third storage chambers partitioned from the first storage chamber W.

Figure 5:
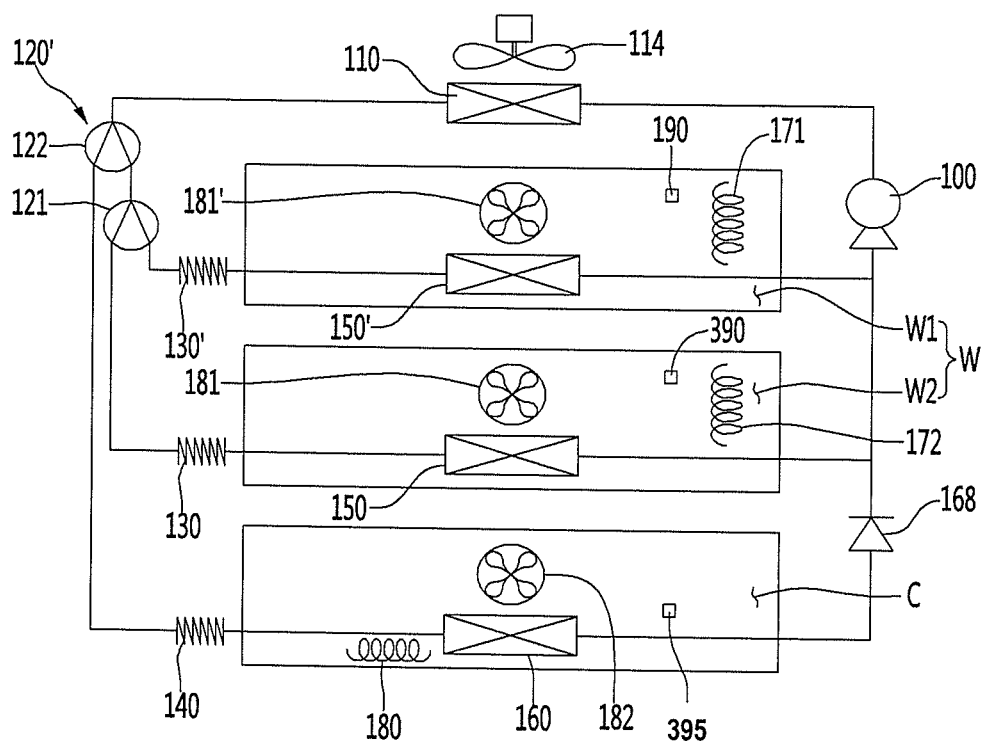
FIGS. 5 to 8 are views illustrating examples of a refrigeration cycle of a refrigerator according to an embodiment of the present disclosure.
Figure 6:
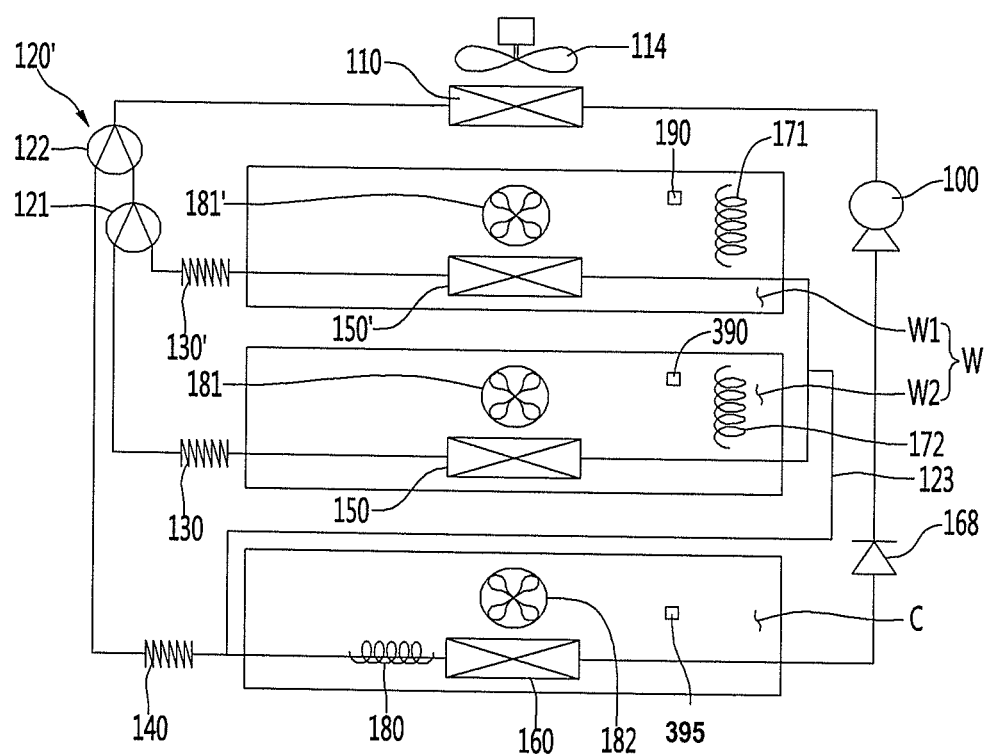
Figure 7:
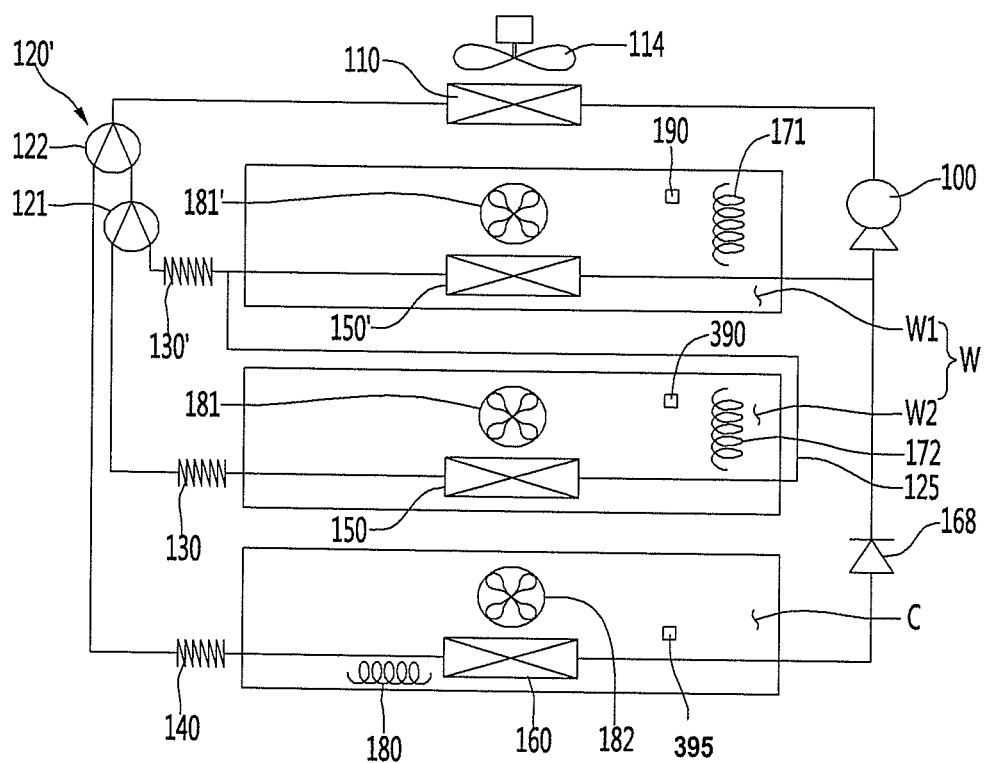

The refrigeration cycle illustrated in FIGS. 5 to 7 may include a compressor 100, a condenser 110, a plurality of expansion mechanisms or devices 130', 130, 140, and a plurality of evaporators 150', 150, 160 and may further include a flow path switching mechanism (or four way valve) 120'. A case where the first region is the first space W1, the second region is the second space W2, and the third region is the second storage chamber C will be described below. The first, second, and third regions are also applicable to cases ii) and iii) described above.

The plurality of evaporators 150', 150, 160 may include a pair of first evaporators 150', 150 capable of independently cooling the first space W1 and the second space W2, respectively, and a second evaporator 160 that can cool a second storage chamber C. One of the pair of first evaporators 150' and 150 may be an evaporator 150' cooling the first space W1, and the other of the pair of first evaporators 150' and 150 may be an evaporator 150 cooling the second space W2.

The plurality of expansion mechanisms 130', 130, and 140 may include a pair of first expansion mechanisms 130' and 130 connected to a pair of first evaporators 150' and 150, and a second expansion mechanism 140 connected to a second evaporator 160. Any one of the pair of first expansion mechanisms 130' and 130 may be an expansion mechanism 130' connected to any one 150' of the pair of first evaporators 150' and 150, and the other of the pair of first expansion mechanisms 130' and 130 may be an expansion mechanism 130 connected to the other one 150 of the pair of first evaporators 150' and 150.

The flow path switching mechanism 120' may include a first valve 121 capable of controlling a refrigerant flowing into the pair of first expansion mechanisms 130' and 130, and a second valve 122 capable of controlling a refrigerant flowing into the first valve 121 and the second expansion mechanism 140. The refrigerator having the refrigeration cycle illustrated in FIGS. 5 to 7 may include a pair of first fans 181' and 181, and a second fan 182 for circulating cold air in the space of the second storage chamber C to the space of the second evaporator 160 and the second storage chamber C and may further include a condensation fan 114 for blowing outside air to the condenser 110.

Any one of the pair of first fans 181' and 181 may be a fan in the first space in which cold air in the first space W1 can be circulated into any one 150' of the pair of first evaporators 150' and 150 and the first space W1. The other one of the pair of fans 181' and 181 may be a fan in the second space in which cold air in the second space W2 can be circulated into any one 150 of the pair of first evaporators 150' and 150 and the second space W2.

The refrigeration cycle illustrated in FIG. 5 may include a first parallel flow path in which a pair of first evaporators 150' and 150 are connected in parallel and a second parallel flow path in which a pair of first evaporators 150' and 150 are connected to the second evaporator 160 in parallel. In this case, a one-way valve 168 may be installed at an outlet side of the second evaporator 160 to prevent the refrigerant at the outlet side of the first evaporators 150 and 150' from flowing back to the second evaporator 160.

The refrigeration cycle illustrated in FIG. 6 may include a parallel flow path in which a pair of first evaporators 150' and 150 are connected in parallel and a serial flow path 123 in which the pair of first evaporators 150' and 150 are connected to a second evaporator 160 in series. One end of the serial flow path 123 may be connected to a parallel flow path in which a pair of first evaporators 150' and 150 are connected in parallel. The other end of the serial flow path 123 may be connected between the second expansion mechanism 140 and the inlet of the second evaporator 160. In this case, a one-way valve 168 may be installed at the outlet side of the second evaporator 150 to prevent the refrigerant at the outlet side of the second evaporator 150 from flowing back to the second evaporator 150.

The refrigeration cycle illustrated in FIG. 7 may include a serial flow path 125 in which a pair of first evaporators 150' and 150 are connected in series, and, a parallel flow path in which the pair of first evaporators 150' and 150 are connected to the second evaporator 160 in parallel. One end of the serial flow path 125 may be connected to the outlet side of any one 150 of the pair of first evaporators 150' and 150. The other end of the serial flow path 125 may be connected to an inlet side of the other 150' of the pair of first evaporators 150 and 150'. In this case, a one-way valve 168 may be installed at the outlet side of the second evaporator 160 to prevent the refrigerant at the outlet side of the second evaporator 160 from flowing back to the second evaporator 160.

Figure 8:
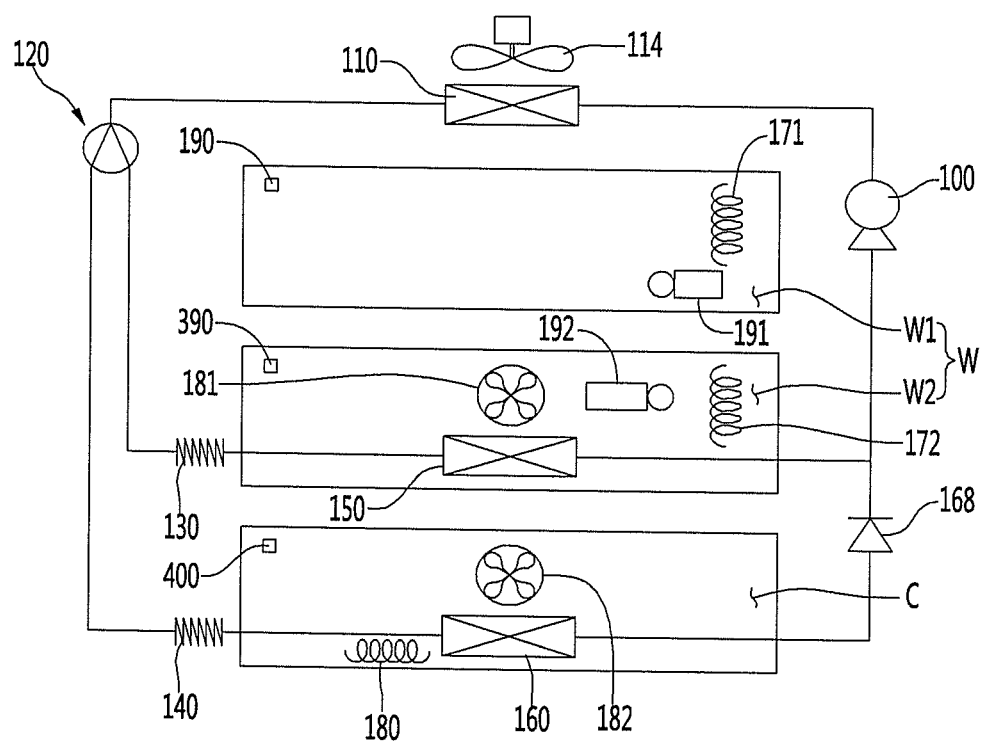

The refrigeration cycle illustrated in FIG. 8 may include one first evaporator 150 instead of the pair of first evaporators 150' and 150 illustrated in FIGS. 5 to 7, and one first expansion mechanism 130 instead of the pair of expansion mechanism 130' and 130. In addition, the refrigeration cycle illustrated in FIG. 8 may include a flow path switching mechanism 120 for controlling the refrigerant flowing into the first expansion mechanism 130 and the second expansion mechanism 140, and the flow path switching mechanism 120 may include a refrigerant valve that can be switched so that the refrigerant flowing from the condenser 110 flows to the first expansion mechanism 130 or the second expansion mechanism 140. In addition, a one-way valve 168 may be installed at the outlet side of the second evaporator 160 to prevent the refrigerant at the outlet side of the second evaporator 160 from flowing back to the second evaporator 160.

Since other configurations and actions other than one first evaporator 150, one first expansion mechanism 130, a flow path switching mechanism 120, and a one-way valve 168 of the refrigeration cycle illustrated in FIG. 8 are the same as or similar to those of the refrigeration cycle illustrated in FIGS. 5 to 7, a detailed description with respect to those will be omitted.

The refrigerator having a refrigeration cycle illustrated in FIG. 8 may include a first fan 181 circulating cold air of the first storage chamber W into the first evaporator 150 and the first storage chamber W instead of the pair of first fans 181' and 181 illustrated in FIGS. 5 to 7. In addition, the refrigerator having the refrigeration cycle illustrated in FIG. 8 may include a first damper 191 for controlling cold air flowing into the first space W1 after being cooled by the first evaporator 150 and a second damper 192 for controlling the cold air flowing into the second space W2 after being cooled by the first evaporator 150. Only one of the first damper 191 and the second damper 192 may be provided. In the refrigerator, one damper may selectively supply air cooled by the evaporator 150 to at least one of the first space W1 and the second space W2.

Modification examples of the refrigeration cycle illustrated in FIGS. 5 to 8 may be applied to a refrigerator having two spaces having different storage temperature ranges from each other. In other words, the modification examples of the refrigeration cycle may be applied to a refrigerator having a first space W1 and a second space W2 or a refrigerator having a first storage chamber W and a second storage chamber C. The refrigeration cycle may be configured with a cycle which does not include the flow path switching mechanisms 120 and 122, the second expansion mechanism 140, the second evaporator 160, the second fan 182, and the one-way valve 168.

The refrigerator may include a first temperature sensor 190 that senses a temperature of the first space W1 and a second temperature sensor 390 that senses a temperature of the second space W2. The refrigerator may include a third temperature sensor 395 that senses a temperature of the second storage chamber C.

The refrigerator may include heating devices 171 and 172 for heating the space and a defrost heating device 180 which defrosts the evaporator 150, 160. The heating devices 171 and 172 and the defrost heating device 180 may be composed of a heater such as a hot wire heater or a planar heater or may be a heat radiating body of a thermoelectric element.

Figure 9:
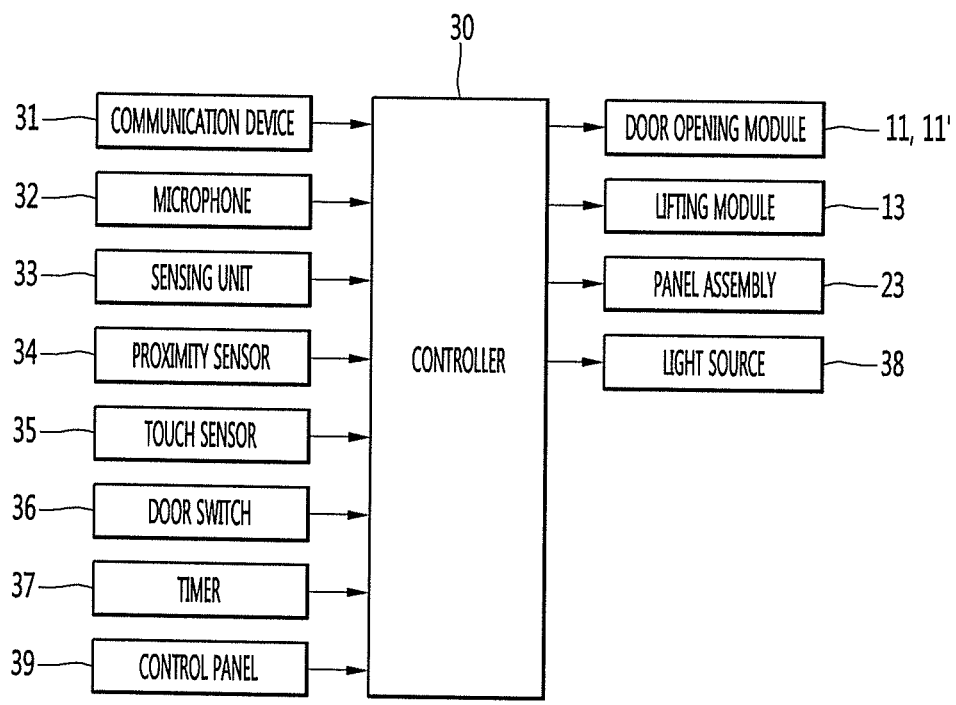
FIG. 9 is a control block diagram of a refrigerator according to an embodiment of the present disclosure.

Referring to FIG. 9, the refrigerator may include a controller 30 that controls various electronic devices such as a motor provided in the refrigerator. The controller 30 may control the refrigerator according to the input value of the input device. The input device may include at least one of a communication device 31 which receives a signal from an external device such as a remote controller such as a remote controller or a mobile terminal such as a mobile phone, a microphone 32 that changes a user's voice to a sound signal, a sensing unit 33 which can sense a user's motion, a proximity sensor 34 (or a distance sensor) which can sense the user's proximity, a touch sensor 35 which can sense the user's touch, a door switch 36 which can detect the opening and closing of the door, and a timer 37 which can measure the lapse of time.

The see-through door may be a door which may alternate between a see through (see-through activation state) and an opaque (see-through deactivation state) state. The see-through door may be a door that is changed from an opaque state to a see-through state according to an input value provided to the controller 30 through the input device. The see-through door may be a door that is changed from a see-through state to an opaque state according to an input value provided to the controller 30 through the input device. The see-through door may be a door in which the see-through door is changed from an opaque state to see-through state, in a state where the see-through door is closed, according to an input value provided to the controller 30 through the input device.

The sensing unit (or sensor) 33 may be a vibration sensor provided on the rear surface of the front panel, the vibration sensor may be formed in black, and visible exposure may be minimized. The sensing unit 33 may be a microphone provided on the rear surface of the front panel, and the microphone may sense sound waves of vibration applied to the front panel. When a user taps the panel assembly 23 a plurality of times at a predetermined time interval is detected through the sensing unit 33, the user may change the see-through door to be activated or deactivated.

The sensing unit 33 may be a device for imaging a user's motion, or a camera. It may be determined whether the image photographed by the sensing unit 33 is similar or identical to a specific motion input in advance, and may be changed to activate or deactivate the see-through door according to the determination result.

If the sensor senses that the user is close to a predetermined distance or more according to the value detected by the proximity sensor 34, the see-through door may be changed to be activated or deactivated. When the sensor senses that the door is closed according to the value detected by the door switch 36, the see-through door may be activated, and when the sensor senses that the door is open, the see-through door may be changed to be inactivated.

The see-through door may be controlled to be deactivated after a certain time elapses after being activated according to the value input through the timer 37. According to the value input through the timer 37, the see-through door may be controlled to be activated when a predetermined time elapses after being deactivated.

If the device for activating or deactivating the see-through door is defined as a transparency control module, for example, the panel assembly 23 and a light source 38 may be used. As an example in which the see-through door is activated or deactivated, there may be a case where the transparency of the see-through door itself may vary. For example, the see-through door may maintain in an opaque state when no current is applied to the panel assembly 23 and may be changed to be transparent when current is applied to the panel assembly 23. In another example, when the light source 38 installed inside the see-through door is turned on, the user may see the storage chamber through the see-through door by the light emitted from the light source 38.

The light source 38 may make the panel assembly 23 appear transparent or translucent so that an inside of the refrigerator (a side of the storage chamber relative to the panel assembly) looks brighter than outside of the refrigerator (outside relative to the panel assembly). The light source 38 may be mounted on the light source mounting portion formed on the cabinet 1 or the light source mounting portion formed on the door and may be disposed to emit light toward the panel assembly 23.

The controller 30 may control the door opening module 11 according to the input value of the input device. The controller 30 may control the lifting module 13 according to the input value of the input device.

Figure 10:
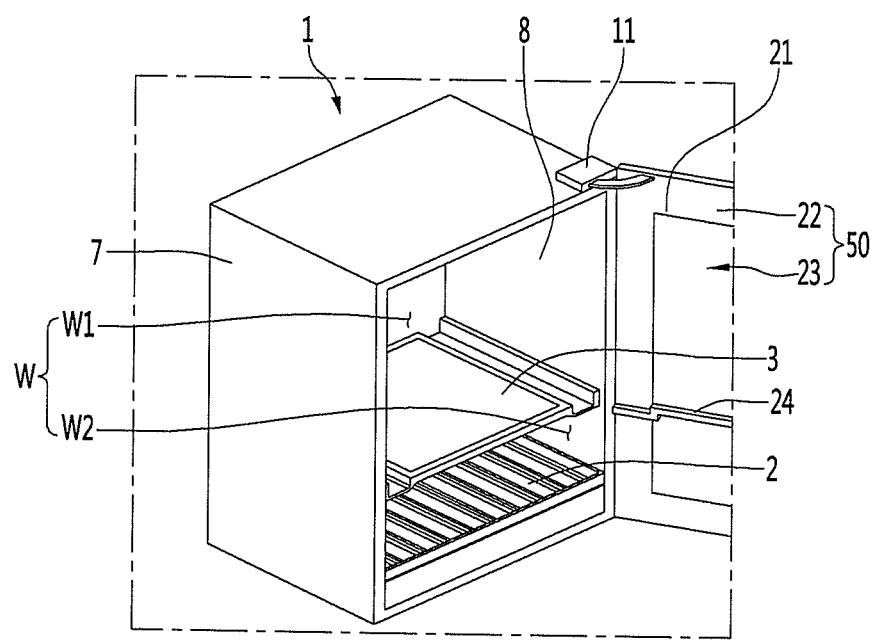
FIG. 10 is a perspective view illustrating a see-through door of a refrigerator according to an embodiment of the present disclosure.

Referring to FIG. 10, the refrigerator may include a door (hereinafter, a see-through door) through which a user may view the storage chamber through a see-through window without opening the door 50 from the outside of the refrigerator. The see-through door may include an outer door 22 and a panel assembly 23. The outer door 22 may be opaque and an opening portion 21 may be formed. The outer door 22 may form an outer appearance of the see-through door. The outer door 22 may be rotatably connected to or connected to the cabinet 1 to be capable of being advanced and retracted. The panel assembly 23 may be arranged in the opening portion 21. The panel assembly 23 may shield the opening portion 21. The panel assembly 23 may form the same outer appearance as the front surface of the outer door 22.

The see-through door may open and close the storage chamber which mainly stores goods (for example, wine) having a large quality change according to the temperature change. In a case where goods having a large quality change due to temperature change are mainly stored in the storage chamber W, the storage chamber W may be opened and closed as short as possible, the number of opening and closing actions is preferably minimized, and the see-through door may open and close the storage chamber W. For example, the see-through door may be provided in the door for opening and closing at least one of the specific goods storage chamber, the constant temperature chamber, and the priority storage chamber.

Figure 11:
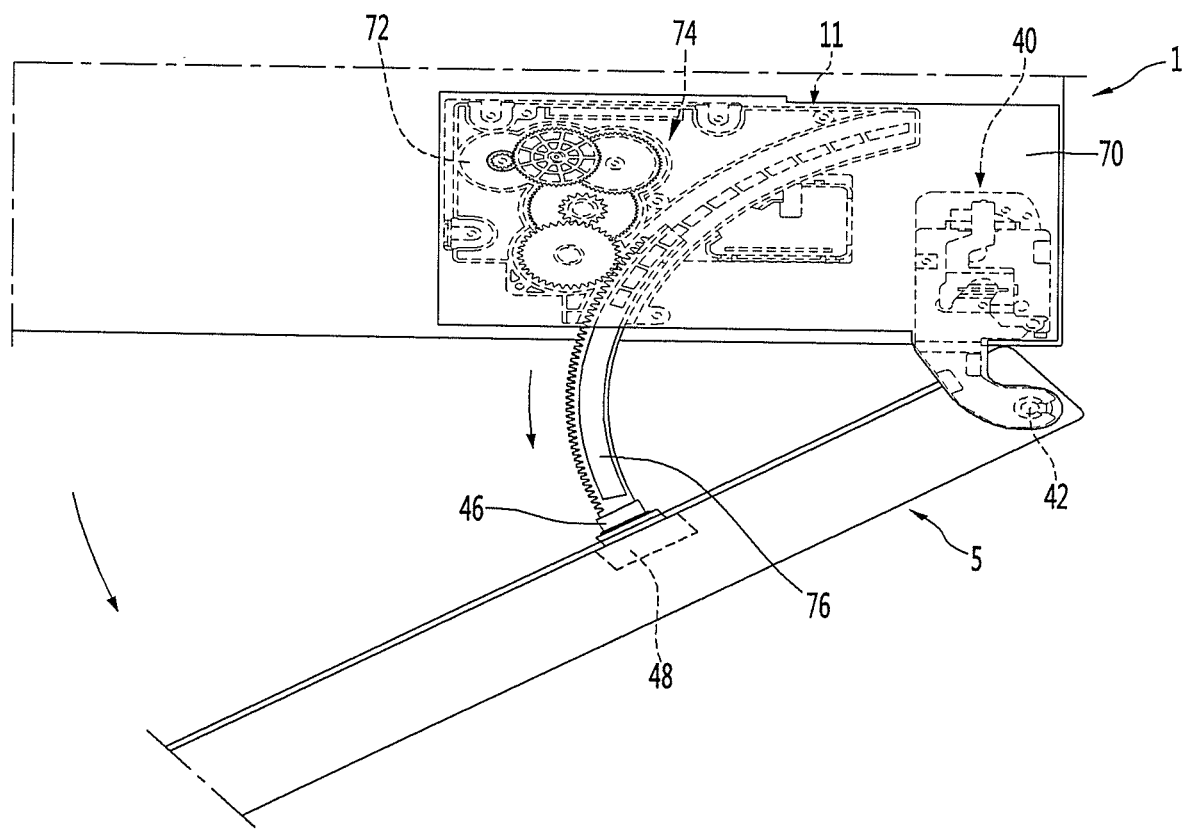
FIG. 11 is a plan view when an example of a door according to an embodiment of the present disclosure is opened in a door opening module.

Referring to FIG. 11, in the refrigerator, a door opening and closing the storage chamber may be an automatic door, and the door for opening and closing the specific goods storage chamber, the constant temperature chamber, and a priority storage chamber may be an automatic door. The refrigerator may include a door opening module 11 for forcibly opening the door 5.

The automatic door may be controlled to be opened or closed according to an input value provided to the controller 30 through the input device. For this purpose, the controller 30 may control the door opening module 11. The cabinet 1 may be installed with a hinge mechanism 40 in which the hinge shaft 42 is connected to the door 5. The refrigerator may further include a module cover 70 that may cover the hinge mechanism 40 and the door opening module 11 together. In addition, the door opening module 11 may include a drive motor 72, a power transmission unit 74, and a push member or lever 76.

When the power of the refrigerator is turned on, the controller 30 may wait to receive an open command of the door 5. When the door opening command is input through the input device, the controller 30 may transmit an opening signal to the drive motor 72 included in the door opening module 11. When the controller 30 transmits an opening signal to the drive motor 72, the drive motor 72 may be rotated in a first direction to move the push member 76 from an initial position to a door opening position. When the drive motor 72 rotates in the first direction, the power transmission unit 74 may transmit a first direction rotational force of the drive motor 72 to the push member 76, the push member 76 may push the door while protruding forward, and the door 5 may be rotated in the forward direction with respect to the cabinet 1.

The controller 30 may determine whether the push member 76 has reached the door opening position in a process of rotating in the first direction of the drive motor 72. For example, the controller may determine that the push member 76 has reached the door opening position when the cumulative rotational speed of the drive motor 72 reaches a reference rotational speed. The controller 30 may stop the rotation of the drive motor 72 when it is determined that the push member 76 has moved to the door opening position.

In a state where the door 5 is rotated through a predetermined angle, the user may manually increase the opening angle of the door 5. When the user increases the opening angle of the door in a state where the push member 76 moves the door 5 to the door opening position, the door sensor including a magnet 46 and a reed switch 48 may sense the manual opening of the door 5, and if the manual opening of the door 5 is sensed by the door sensor, the controller 30 may output a return signal to the drive motor 72.

The controller 30 may transmit the return signal to the drive motor 72 so that the push member 76 returns to the initial position and the drive motor 72 may be reversely rotated in a second direction opposite to the first direction. When the push member 76 has returned to the initial position, the controller 30 may stop the drive motor 72.

Figure 12:
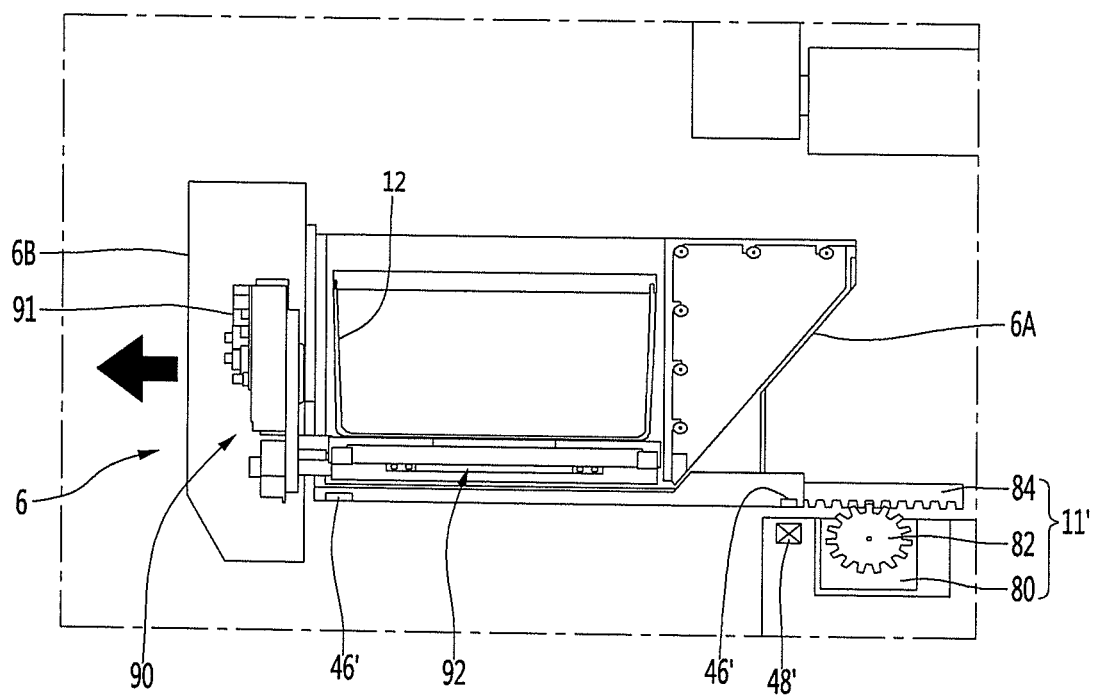
FIG. 12 is a cross-sectional view when another example of a door according to an embodiment of the present disclosure is opened by the door opening module.

The door opening module 11' illustrated in FIG. 12 may automatically open the door 6 disposed in the cabinet 1 to be capable of being advanced and retracted. The refrigerator may include a door having a high height and a door having low height, and the door opening module 11' may be installed to automatically open a door having a lower height than other doors. Such a door may be a retractable automatic door which is automatically opened by the door opening module 11'.

The door 6 advanced and retracted by the door opening module 11' may include a drawer body 6A and a door body 6B disposed at the drawer body 6A to open and close the storage chamber. The door opening module 11' may include a drive motor 80, a pinion 82, and a rack 84. The pinion 82 may be connected to the rotation shaft of the drive motor 80. The rack 84 may extend from the door 6, in particular, the drawer body 6A.

The refrigerator may further include a door sensor that senses a position of the door 6, and the door sensor may sense a pair of magnets 46' spaced apart from the door 6 and a reed switch 48' sensing the magnet 46'. When the power of the refrigerator is turned on, the controller 30 may wait to receive an opening command of the door 6. When the door opening command is input through the input device, the controller 30 may transmit an opening signal to the drive motor 80.

The drive motor 80 may be rotated in the first direction by the controller 30 when an opening signal is input, and the pinion 82 and the rack 84 may transmit the rotational force of the drive motor 80 to the drawer body 82, the drawer body 6A may advance the door body 6B while advancing forward in the storage chamber, and the door body 6B may be advanced to be spaced apart from the cabinet 1 toward the front of the cabinet 1. The controller 30 may sense that the door 6 has reached the opening position by the door sensor, and when the door 6 has reached the opening position, the controller 30 may stop the rotation of the drive motor 80.

When the drawer body 6A is advanced as described above, the upper surface of the drawer body 6A may be exposed. In a state where the drawer body 6A is advanced to the opening position, the user may enter a door closing command such that the drawer body 6A retracts to the closing position via the input device. For example, if the motion sensed by the sensing unit 33 coincides with a specific motion, the controller 30 may transmit a close signal to the drive motor 80. The controller 30 may sense the proximity of the user by the proximity sensor 34, and transmit a closing signal to the drive motor 80 when the proximity sensor 34 detects that the user has moved more than a predetermined distance.

When the close signal is input, the drive motor 80 may be reversely rotated in a second direction opposite to the first direction. In reverse rotation of the drive motor 80, the pinion 82 and the rack 84 may transmit the rotational force of the drive motor 80 to the drawer body 6A, and while the drawer body 6A retracts into the storage chamber, the door body 6B may be retracted and the door body 6B may be retracted in close contact with the cabinet 1 toward the front of the cabinet 1. The controller 30 may sense that the door 6 has reached the closing position by the door sensor, and if the door 6 has reached the closing position, the controller 30 may stop the rotation of the drive motor 80.

Figure 13:
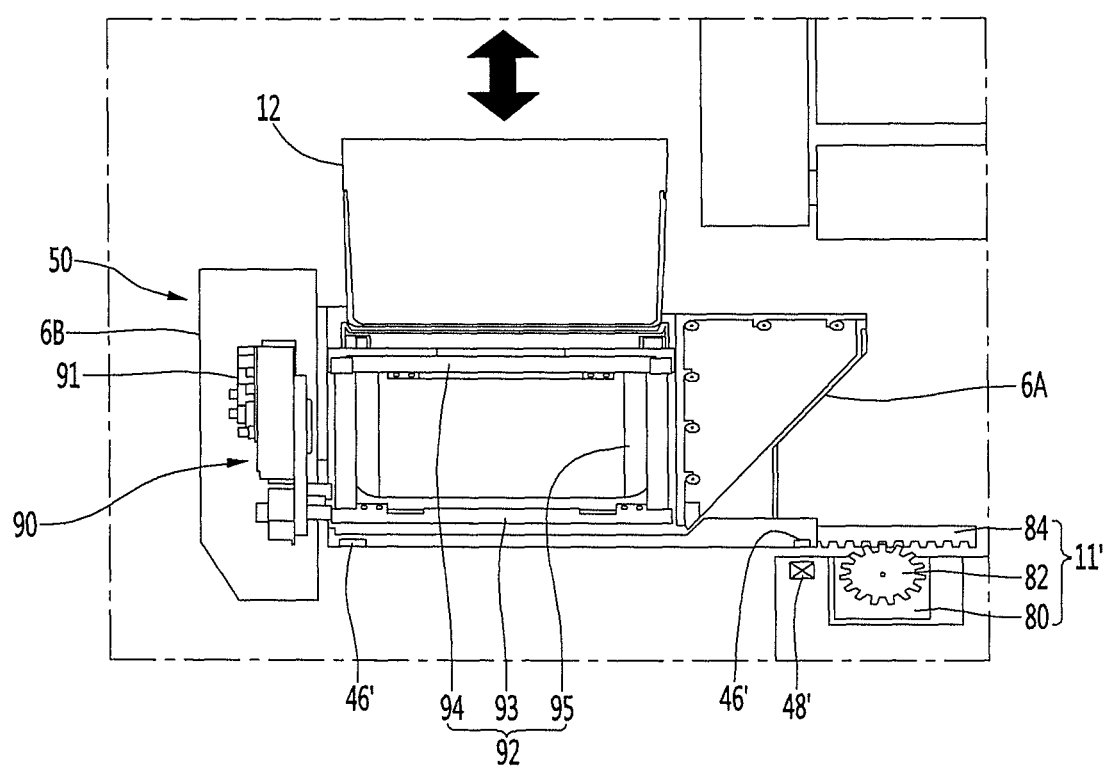
FIG. 13 is a sectional view when a holder illustrated in FIG. 12 is lifted.
Figure 14:
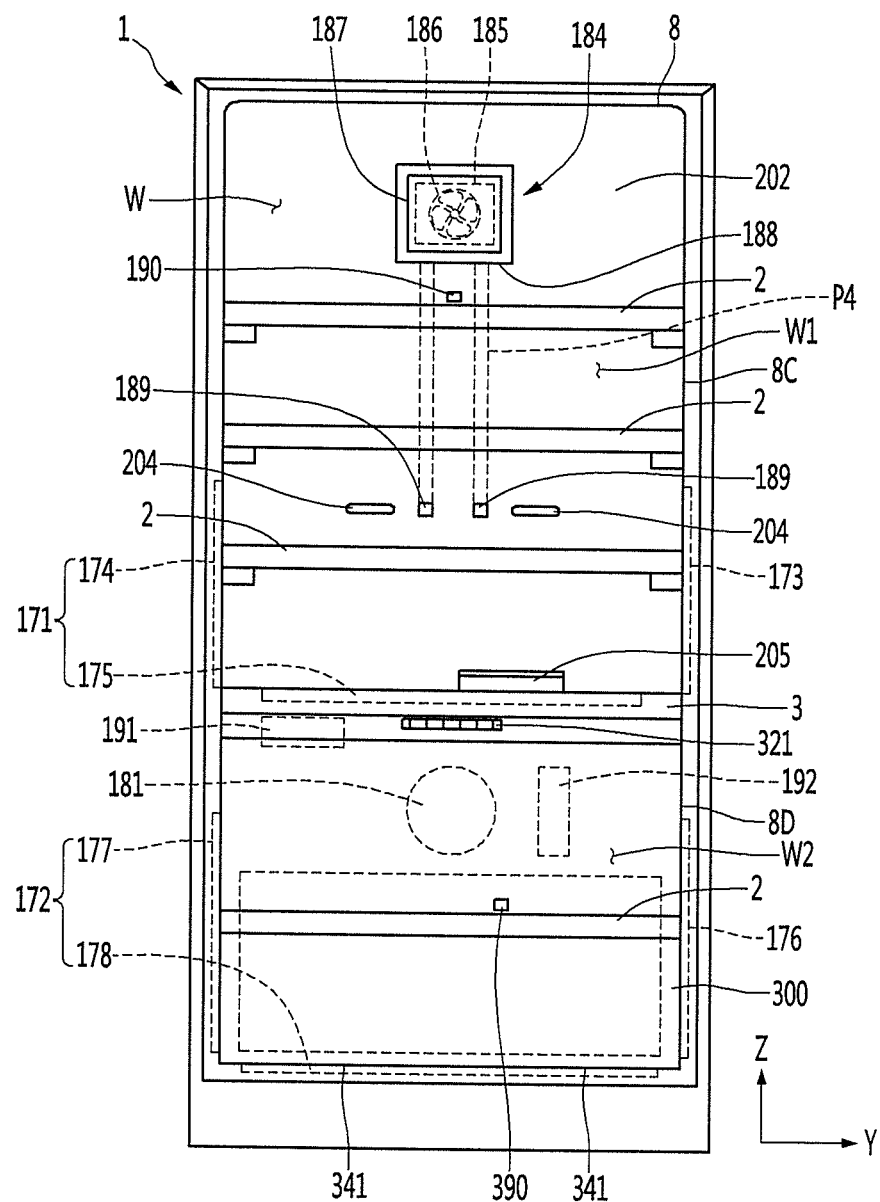
FIG. 14 is a front view illustrating a storage chamber of a refrigerator according to an embodiment of the present disclosure.
Figure 15:
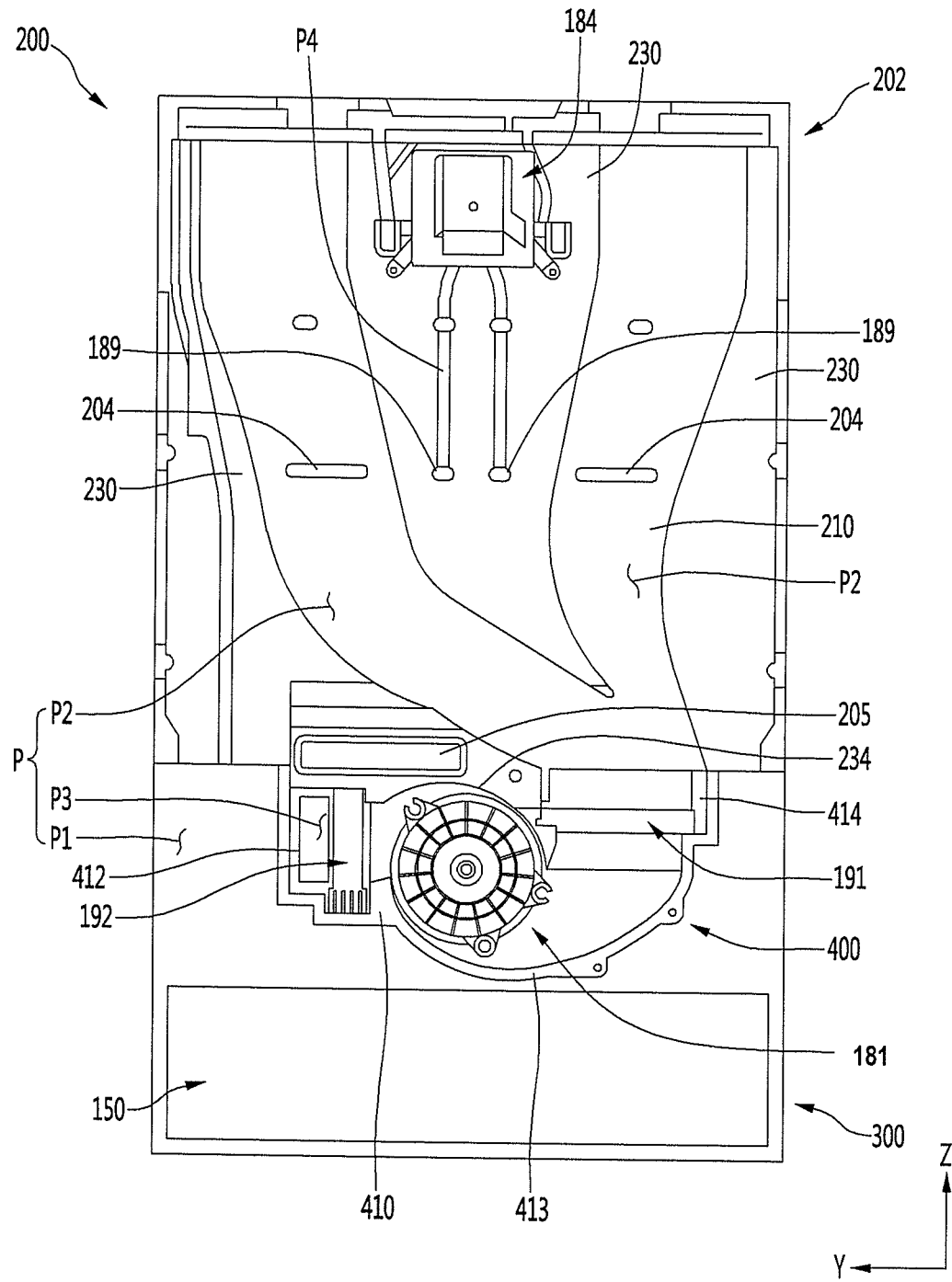
FIG. 15 is a rear view illustrating an inner portion of the inner guide according to an embodiment of the present disclosure.

Referring to FIG. 13, the refrigerator may further include a lifting module 13 which allows the holder 12 to be automatically lifted and lowered after the holder 12 is moved forward in a state where the door 50 is opened. The holder 12 may be a shelf, a drawer, a basket, or the like on which goods can be placed. The lifting module 13 may be provided in the storage chamber or at least one of the rotatable door 5 and the advancing and retracting type door 6 for opening and closing the storage chamber. The refrigerator may have both a holder having a high height and a holder having a low height.

The lifting module may be provided in a storage chamber in which a holder having a lower height than other holders is located. The lifting module for lowering may be arranged in a storage chamber in which a holder having a relatively higher height than other holders is located. The lifting module 13 may include a lower frame 93, an upper frame 94, an lifting and lowering mechanism 92 having at least one link 95, and a drive mechanism 90 capable of lifting and lowering the upper frame 94. The drive mechanism 90 may include a lifting and lowering motor 91 and a power transmission member connected to the lifting and lowering motor 91 to transfer the drive force of the lifting and lowering motor 91 to the upper frame 94.

When the power of the refrigerator is turned on, the controller 30 may wait for a lifting command of the holder 12 to be input. When the lifting command is input through the input device, the controller 30 may transmit a lifting signal to the lifting and lowering motor 91 included in the lifting module 13. When the controller 30 transmits an opening signal to the lifting and lowering motor 91, the upper frame 94 may lift, and the holder 12 may be lifted to the upper side of the drawer body 6B.

The user may input a lowering command through the input device, and the controller 30 may transmit a lowering signal to the lifting and lowering motor 91 when the lowering command is input through the input device. The lifting and lowering motor 91 may be reversely rotated in a second direction opposite to the first direction. Upon reverse rotation of the lifting and lowering motor 91, the upper frame 94 may be lowered to the inner lower portion of the drawer body 82, and the holder 12 may be inserted into the drawer body 6B together with the upper frame 94.

The inner guide 200 may be provided in the cabinet 1 in which the first storage chamber W is formed, and may be arranged in the inner case 8 to partition the storage space and the air flow path P. The air flow path P may be formed between the inner guide 200 and the inner case 8 of the inner space of the inner case 8 or may be formed in the inner guide 200.

The refrigerator may include first cooling device and heating device for controlling the temperature of the first storage chamber W. The first cooling device may be provided in the air flow path P and may be a heat absorbing body of the thermoelectric element or the first evaporator 150 through which the refrigerant passes. Hereinafter, the first cooling device will be described with 150 which is the same reference numeral as the first evaporator which can be one example.

The heating device may be provided in the storage space or in the inner case 8. The heating device may be a heat generating body of the thermoelectric element or a heater or the like, and hereinafter, the heating device will be described as a heating device.

The refrigerator may include a fan 181 for circulating air in the storage space to the air flow path P and the storage space. The fan 181 may be provided in the inner guide 200. The inner guide 200 may form a storage space together with the inner case 8. The inner guide 200 may cover the first cooling device 150 and the fan 181.

When the inner guide 200 is arranged in front of the rear body of the inner case 8, the storage space may be a space in front of the inner guide 200 among the inside of the inner case 8, and the air flow path P may be formed between the inner guide 200 and the rear body of the inner case 8 or may be formed inside the inner guide 200.

When the refrigerator further includes the partition member 3, the partition member 3 may partition the first space W1 and the second space W2. The inner guide 200 may have a discharge port 204 and a suction port 205 spaced apart from each other, and the discharge port 204 and the suction port 205 may face the first space W1.

The inner guide 200 may include a heat exchange flow path P1 in which the first cooling device 150 and the fan 181 are received. The inner guide 200 may have a discharge flow path P2 through which air blown by the fan 181 is guided to the discharge port 204. The inner guide 200 may include an additional discharge flow path P3 for guiding the air blown by the fan 181 to be discharged to the additional discharge port 321.

The heat exchange flow path P1, the discharge flow path P2, and the additional discharge flow path P3 may constitute an air flow path P for guiding air to circulate between the first cooling device 150 and the storage space, and the first cooling device 150 and the fan 181 may adjust the temperature of the first space W1 and the second space W2 in a state received in the air flow path P.

The air guide 400 may include a front housing 410 and a rear housing 420 in which the fan 181 is received. The air guide 400 may have an outlet 412 that communicates with the additional discharge port 321. The outlet 412 may face the additional discharge port 321 to discharge air to the additional discharge port 321 or may be in communication with the additional discharge port 321 through a discharge duct.

The refrigerator may include a guide 234 that guides air forced by the fan 181 inside the air guide 400 to the outlet 412. The guide 234 may be formed in the discharge guide 202 to guide the air blown from the fan 181 to the outlet 412.

The air guide 400 may include a scroll 413 and an opening portion 414 through which air may be guided to the discharge flow path P2. The scroll 413 may guide the air blown from the fan 181 to the opening portion 414. The opening portion 414 may communicate with the lower end of the discharge flow path P2.

The first damper 191 may be provided in the air flow path P and may adjust the air supplied to the first space W1. The second damper 192 may be provided in the air flow path P and may adjust the air supplied to the second space W2. The inner guide 200 may include a first temperature sensor 190 for sensing a temperature of the first space W1 and a second temperature sensor 390 for sensing a temperature of the second space W2. The inner guide 200 may include a discharge guide 202 and an inner cover 300.

The discharge guide 202 may be arranged higher than the inner cover 300. The discharge guide 202 may include a discharge body 210 in which the discharge port 204 and the suction port 205 are formed, and a flow path body 230 provided in the discharge body 210 and forming the discharge flow path P2.

The first cooling device 150 and the fan 181 may supply air to the first space W1 and the second space W2 through the air flow path P. The first cooling device 150 may be received in the inner cover 300. The fan 181 may forcedly circulate the air heat exchanged with the first cooling device 150, and the air circulated by the fan 181 may be discharged and guided to the first space W1 and the second space W2 by the discharge guide 202 and the inner cover 300.

The discharge guide 202 may face the first space W1, and the discharge hole 204 and the suction hole 205 may be formed in the discharge guide 202. A portion of the discharge guide 202 facing the first space W1 may include a heating air generation module (HG) module 184 and a first temperature sensor 190. The HG module 184 may include a circulation fan 186. The HG module 184 may include a purifying unit 185 such as an air purifying filter and may purify the air in the first space W1.

The circulation fan 186 may be provided in the inner guide 200. In the inner guide 200, when the circulation fan 186 is operated, a circulation flow path P4 through which air flowing by the circulation fan 186 passes may be formed. When the circulation fan 186 is driven, the inner guide 200 may have an inlet 188 through which air in the storage space flows into the circulation flow path P4. The inner guide 200 may have an outlet 189 through which air from the circulation flow path P4 is discharged into the storage space. The inlet 188 and the outlet 189 may communicate with the first space W1. The circulation fan 186 may circulate air in the first space W1 into the circulation flow path P4 and the first space W1.

The purification unit 185 may be provided in the circulation flow path P4, and the air passing through the circulation flow path P4 may be purified by the purification unit 185. The inner guide 200 may further include an inlet body 187 that forms the discharge guide 202 and the inlet 188.

The inner cover 300 may be connected to the discharge guide 202. The inner cover 300 may face the second space W2, and the additional discharge port 321 and the additional suction port 341 may be formed in the inner cover 300. The additional suction port 341 may be formed under the inner cover 300, and the air sucked into the additional suction port 341 may flow to the first cooling device 150.

The second temperature sensor 390 may be provided in the inner cover 300 and configured to sense the temperature of the second space W2. The refrigerator may perform a heating mode H (see FIG. 4) by using a heating device. The heating device may be operated independently of the first cooling device 150 provided in the air flow path P.

The refrigerator may perform the cooling mode E (see FIG. 4) by the first cooling device 150 provided in the air flow path P and perform the heating operation H by the heating device. The heating device may heat only one of the first space W1 and the second space W2 and may be provided for each of the first space W1 and the second space W2.

The heating device may include a first heating device 171 for heating the first space W1. The first heating device 171 may include a pair of first side heating devices 173 and 174 provided in the first body 8C facing the first space W1. The first heating device 171 may further include an inner heating device 175 arranged on the partition member 3 or the shelf 2. The inner heating device 175 may be exposed to the partition member 3, the shelf 3, or the outer surface of the heating body to directly heat the air in the storage space.

The heating device may further comprise a second heating device 172 for heating the second space W2. The second heating device 172 may include a pair of second side heating devices 176 and 177 provided on the second body 8D towards the second space. The second heating device 172 may further include a lower heating device 178 provided in the lower body of the inner case 8.

The controller 30 may control the heating device. The controller 30 may operate or stop the heating device. When the heating device is a heater, the operation of the heating device may mean that the heater is heated, and for example, it may be the case that the heater turns on. Stopping the heating device may mean that the heater is not heated, for example, it may be the case that the heater turns off.

The controller 30 may operate or stop the first cooling device 150. When the first cooling device 150 is an evaporator, the operation of the first cooling device 150 may mean that the refrigerant flows to the first cooling device 150 and may be a first mode in which the compressor 100 is turned on, and the refrigerant valve guides the refrigerant to the first cooling device 150, for example. In addition, the stop of the first cooling device 150 may mean that the refrigerant does not flow to the first cooling device 150 and may be a second mode in which the refrigerant valve does not supply the refrigerant to the evaporator and guides the refrigerant to the second cooling device 160, for example.

Examples of the second cooling device 160 may be a heat absorbing body of the thermoelectric element or the second evaporator 160 through which the refrigerant passes. Hereinafter, the second cooling device is described with the same reference numeral 160, which is the same as the second evaporator which may be one example.

The refrigerator may selectively supply the refrigerant to the first cooling device 150 and the second cooling device 160 according to the mode of the refrigerant valve. Hereinafter, the refrigerant valve is described with the same reference numeral 120, which is the same as the flow path switching mechanism for convenience.

The refrigerant valve 120 may be selectively implemented in a first mode of guiding the refrigerant to the first cooling device and a second mode of guiding the refrigerant to the second cooling device. When the cooling in the temperature of the first storage chamber W (hereinafter, referred to as a first storage chamber temperature) is not satisfied, the controller 30 may control the refrigerant valve 120 according to the first mode.

When the first storage chamber W is partitioned into the first space W1 and the second space W2, if the temperature of any one of the second spaces W2 and the first spaces W1 is equal to or higher than the target temperature upper limit value, the cooling in the first storage chamber temperature may not be satisfied. If the temperature of the first space W1 is equal to or higher than the target temperature upper limit value of the first space W1 or if the temperature of the second space is equal to or higher than the target temperature upper limit value of the second space W2, the controller 30 determines that, in the first storage chamber temperature, the cooling is not satisfied. As described above, in the first storage chamber temperature, if the cooling is not satisfied, the controller 30 may control the refrigerant valve 120 in the first mode.

If the temperature of each of the second space W2 and the first space W1 is equal to or lower than the target temperature lower limit value, the first storage chamber temperature may be satisfied. If the temperature of the first space W1 is equal to or higher than the target temperature upper limit value of the first space W1 and the temperature of the second space is equal to or higher than the target temperature upper limit value of the second space W2, the controller 30 may determine that, in the first storage chamber temperature, the cooling is satisfied. As described above, when the temperature of the first storage chamber is satisfied, the controller 30 may control the refrigerant valve 120 in the second mode.

The controller 30 may perform a general operation of adjusting the temperature of the first storage chamber W, and in the general operation, the controller 30 may perform the cooling operation E and the heating operation H for each of the spaces W1 and W2. In the cooling mode of the first space W1, the first cooling device 150 and the fan 181 may be operated, and the first heating device 171 may be stopped. In the refrigerator, the refrigerant valve, the compressor 100, and the like may be controlled so that the refrigerant is supplied to the first cooling device 150, and the first damper 191 may be opened.

In the heating mode of the first space W1, the first heating device 171 may be operated. In this case, at least one of the fan 181 and the circulation fan 186 may be operated. In the cooling mode of the second space W2, the first cooling device and the fan 181 may be operated, and the second heating device 172 may be stopped. In this case, the refrigerator may control the refrigerant valve, the compressor 100, and the like so that the refrigerant is supplied to the first cooling device 150, and the second damper 192 may be opened. In the heating mode of the second space W2, the second heating device 172 may be operated. In this case, the fan 181 may be activated or stopped.

The controller 30 may selectively perform the general operation of adjusting the temperature of the second storage chamber W2 and the door load response operation of the second storage chamber. The door load response operation of the second storage chamber may be a special operation that may be performed when the load of the second storage chamber W2 is rapidly increased after the second door 6 is opened.

The controller 30 may control the refrigerant valve 120 to allow the refrigerant to flow to the second cooling device 160 during the door load response operation of the second storage chamber. The door load response operation of the second storage chamber may be performed to quickly lower the temperature of the second storage chamber W2 and may be performed in preference to the general operation of the second storage chamber.

In the refrigerator, the cooling in the first storage chamber temperature may not be satisfied, and the second storage chamber temperature may not be satisfied. The controller 30 may perform the general operation of the first storage chamber W in preference to the general operation of the second storage chamber C. If the cooling in the first storage chamber temperature is not satisfied and the cooling in the second storage chamber temperature is not satisfied, the controller 30 may control the refrigerant valve 120 in the first mode to preferentially cool the first storage chamber.

If the cooling in the temperature of at least one of the first space W1 and the second space W2 of the first storage chamber W is not satisfied, and the cooling in the temperature of the second storage chamber C is not satisfied, the controller 30 may control the refrigerant valve 120 to the first mode until the temperature of each of the first space W1 and the second space W2 changes to cooling satisfaction. When the cooling in the temperature of each of the first space W1 and the second space W2 is satisfied, the controller 30 may control the refrigerant valve 120 in the second mode to cool the second storage chamber C.

The controller 30 may control the refrigerant valve 120 in the first mode and then control the refrigerant valve 120 in the second mode if the temperature of the first storage chamber is satisfied. The controller 30 may stop the compressor 100 when the temperature of the second storage chamber is satisfied after controlling the refrigerant valve 120 in the second mode.

In the refrigerator, during the operation thereof, the first storage chamber temperature may not be satisfied and the second storage chamber may be a door load response condition. The controller 30 may control the general operation of the first storage chamber W in preference to the door load response operation of the second storage chamber W2.

The controller 30 may control the refrigerant valve 120 to the first mode when the second storage chamber is a door load corresponding condition and the cooling in the first storage chamber temperature is not satisfied. The controller 30 may control the refrigerant valve 120 in the first mode, and then control the refrigerant valve 120 in the second mode if the temperature of the first storage chamber is satisfied.

The controller 30 may end the door load response operation when a set time elapses after controlling the refrigerant valve in the second mode. The controller 30 may stop the compressor 100 when the first storage chamber temperature is satisfied and the second storage chamber temperature is satisfied at the end of the door load response operation.

If the second storage chamber is in a door load response condition, the heating in the first space W1 is not satisfied, and the heating in the second space W2 is not satisfied, the controller 30 may operate the first storage chamber W and the second storage chamber C independently, for this purpose, operate the heating device, and control the refrigerant valve 120 in the second mode. The controller 30 may end the door load response operation when the set time elapses after controlling the refrigerant valve in the second mode. The controller 30 may stop the compressor 100 when the second storage chamber temperature is satisfied at the end of the door load response operation.

Figure 16:
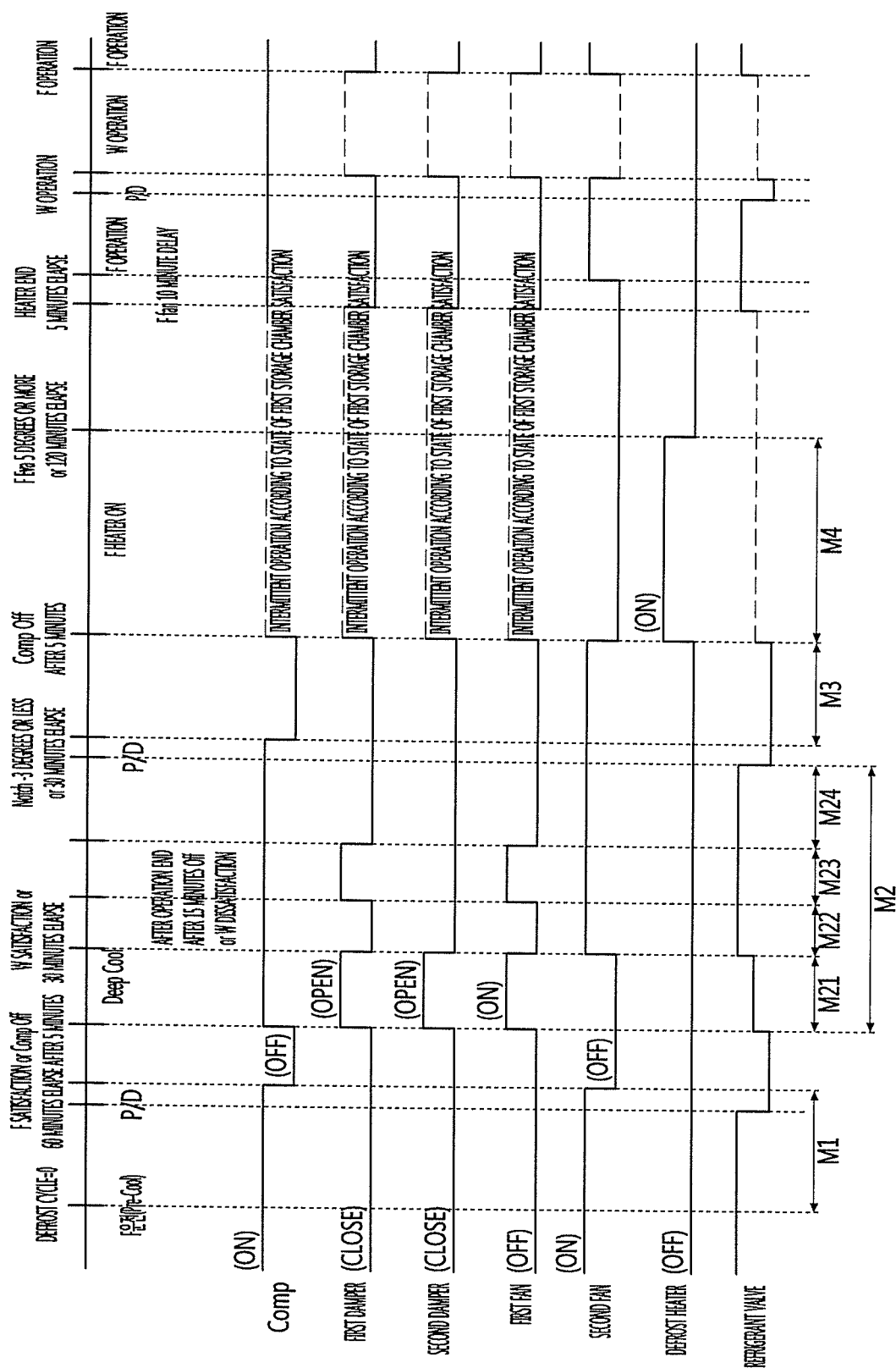
FIG. 16 is a diagram illustrating operational status of a compressor, a first damper, a second damper, a first fan, a second fan, a heating device, and a refrigerant valve of a refrigerator according to the present disclosure when the refrigerator is performing a defrost operation.

Referring to FIG. 16, hereinafter, the first heating device 171 will be referred to as a first heater 171, the second heating device 172 will be referred to as a second heater 172, and the defrost heating device 180 will be referred to as a defrost heater 180. In the refrigerator, while the first storage chamber W is not operated by the cooling operation, the second storage chamber C may be cooled.

In a single cooling operation of the second storage chamber C, in the refrigerator 100, the compressor 100 may turn on, the first damper 191 and the second damper 192 may be closed, the first fan 181 may turn off, the second fan 182 may turn on, the defrost heater 180 may turn off, and the refrigerant valve 120 may be in a second evaporator supply mode. The refrigerator may perform the defrost operation which defrosts the second evaporator 150 when the defrost condition which defrosts the second evaporator 160 is satisfied during the independent cooling operation of the second storage chamber as described above.

When the second storage chamber C is the freezing chamber, the controller 30 may perform the following defrost operation, and even when the second storage chamber C is the refrigerating chamber, the controller 30 may perform the following defrost operation. The defrost condition may be determined by at least one of the factors such as a set defrosting cycle, an on integration time of the compressor 100, and a temperature of the second evaporator 160. As an example of the defrost operation, the controller 30 may start the defrost operation at a set defrosting period (for example, 24 hours), and in this case, the controller 30 may start the defrost operation based on the time counted by the timer 37.

In another example of the defrost operation, the controller 30 may accumulate the on-time of the compressor 100 on a counter to count the compressor on-accumulation time, and when the counted compressor on-accumulation time reaches the reference accumulation time, it may be possible to start the defrost operation by determining as the start of the defrost operation. In this case, the controller 30 may compare the on-accumulation time of the compressor 100 with the reference accumulation time regardless of the first to third cooling modes, and it may also be possible to compare only the on-accumulation time of the third cooling mode with the reference accumulation time.

As another example of the defrost operation, when the temperature detected by the defrost sensor (e.g., third temperature sensor 395 that senses a temperature of the second storage chamber C) sensing the temperature of the second evaporator 160 reaches the defrost start temperature, the defrost operation may be started, and in this case, the controller 30 may start the defrost operation when the temperature sensed by the defrost sensor is the defrost start temperature. The start of the defrost operation may be determined by a combination of the above examples, and of course, it may be determined in various ways in addition to the above examples.

If the defrost condition is satisfied during the independent cooling operation of the second storage chamber C, the controller 30 may not immediately turn on the defrost heater 180, but after performing at least one special mode to be described later, the defrost heater 18 may be turned on. When the defrost condition is satisfied, the controller 30 may perform a second storage chamber pre-cool mode M1. Hereinafter, the second storage chamber pre-cool mode M1 will be described first.

The controller 30 may additionally turn on the first fan 181 without turning off the compressor 100 when the defrost condition is satisfied, and may also additionally turn on the second fan 182 that is in a state of turning on, like the compressor 100, and may maintain the second evaporator supply mode of the refrigerant valve 120. The second storage chamber pre-cool mode M1 may be defined as a mode that the compressor 100 turns on and the second fan 182 turns on after the defrost condition is satisfied during the independent cooling operation of the second storage chamber C, and the second evaporator supply mode of the refrigerant valve 120 is maintained.

In the second storage chamber pre-cool mode M1 described above, the second storage chamber may be additionally cooled even if the defrost condition is satisfied, and the second storage chamber pre-cool mode M1 may be a mode in which the temperature of the second storage chamber is lowered in advance so that the second storage chamber temperature is not excessively increased and maintained at a proper temperature or less, in the defrost mode M4 described later. The controller 30 may end the second storage chamber pre-cool mode M1 when the second storage chamber pre-cool mode M1 is in an end condition during the second storage chamber pre-cool mode M1.

An example of an end condition of the second storage chamber pre-cool mode M1 may be a case where the second storage chamber temperature is satisfied during the second storage chamber pre-cool mode M1 and, for example, may be a case where the second storage chamber temperature is lowered below the lower limit value of the target temperature of the second storage chamber during the second storage chamber pre-cool mode M1. Another example of the end condition of the second storage chamber pre-cool mode M1 may be a case where a first set time (for example, 60 minutes) elapses since the start of the second storage chamber pre-cool mode M1.

When the second storage chamber temperature is satisfied during the second storage chamber pre-cool mode M1 or when the first set time (for example, 60 minutes) elapses after the start of the second storage chamber pre-cool mode M1, after the refrigerator is pumped down (P/D), the second storage chamber pre-cool mode M1 may be ended.

The controller 30 may control the refrigerant valve 120 to the closed mode while the compressor 100 and the second fan 182 remain turned on. In this case, the refrigerant circulating in the refrigeration cycle may be collected between the refrigerant valve 120 and the second evaporator 160, in particular, between the refrigerant valve 120 and the compressor 100. The controller 30 may stop the pump down after the pump down set time (for example, 5 minutes) elapses after the start of the pump down, may turn off the compressor 100 to stop the pump down, may turn off the second fan 182, and may end the second storage chamber pre-cool mode M1.

The controller 30 may maintain the current state for a second set time (for example, 5 minutes) after turning off the compressor 100 as described above, and, if the second set time elapses after the compressor 100 turns off, before the defrost mode M4 described later, a deep cool mode M2 may be performed to cool the first storage chamber W and the second storage chamber. The controller 30 may start the deep cool mode M2 when the second set time (for example, 5 minutes) elapses after the second storage chamber pre-cool mode M1 ends.

Hereinafter, the deep cool mode M2 will be described first. The deep cool mode M2 may include a first storage chamber preferential cooling process M21 for cooling the first storage chamber W in preference to the second storage chamber C. The controller 30 may start the first storage chamber preferential cooling process M21 if the second predetermined time (for example, 5 minutes) elapses after the second storage chamber pre-cool mode M1 is ended.

To this end, the controller 30 may drive the compressor 100, control the first damper 191 and the second damper 192 to be open, turn on the first fan 181, and control the refrigerant valve 120 to be in the first evaporator supply mode. In this control state, the air in the storage space W may be cooled by the first evaporator 150 and then flow into the storage space W, and the storage air may be cooled by the first evaporator 150.

The controller 30 may end the first storage chamber preferential cooling process M21 if the first storage chamber preferential cooling process M21 is in an end condition during the first storage chamber preferential cooling process M21. An example of an end condition of the first storage chamber preferential cooling process M21 may be a case where the first storage chamber temperature is satisfied during the first storage chamber preferential cooling process M21, for example, may be a case where the first storage chamber temperature is lowered below the lower limit value of the first storage chamber target temperature during the first storage chamber preferential cooling process M21, and, in this case, may be a case where the temperature of the first space W1 is lowered below the lower limit value of the target temperature of the first space and the temperature of the second space W2 is lowered below the target temperature lower limit value of the second space.

Another example of an end condition of the first storage chamber preferential cooling process M21 may be a case where the third set time elapses after the start of the first storage chamber preferential cooling process M21. When the first storage chamber temperature is satisfied during the first storage chamber preferential cooling process M21 or when the third set time elapses after the first storage chamber preferential cooling process M21 is started, the controller 30 may end the first storage chamber preferential cooling process M21. The controller 30 may control the first damper 191 and the second damper 192 in a closed mode to end the first storage chamber preferential cooling process M21 and turn off the first fan 181.

The deep cool mode M2 may include a second storage chamber preferential cooling process M22 for cooling the second storage chamber C in preference to the first storage chamber W. The controller 30 may perform the second storage chamber preferential cooling process M22 after the first storage chamber preferential cooling process M21, turn on the second fan 182 for the second storage chamber preferential cooling process M22, and control the refrigerant valve 120 in the second evaporator supply mode. In this control, the air in the second storage chamber C may circulate through the second evaporator 160 and the second storage chamber C, and the second storage chamber C may be cooled by the second evaporator 160.

The deep cool mode M2 may include a natural defrosting and cooling process M23 for cooling the second storage chamber C while naturally defrosting the first space. The controller 30 may perform the natural defrosting and cooling process M23 for cooling the second storage chamber C while naturally defrosting the first space if the first space natural defrost condition is in the middle of the second storage chamber preferential cooling process M22.

In a case of the natural defrosting and cooling process M23 condition, the controller 30 may end the second storage chamber preferential cooling process M22 and start the natural defrosting and cooling process M23. An example of the natural defrosting and cooling process M23 condition may be a case where a fourth set time (for example, 15 minutes) elapses since the end of the first storage chamber preferential process.

Another example of the natural defrosting and cooling process M23 condition may be a case where the temperature of the first space W1 is not satisfied during the second storage chamber preferential cooling process M22, and, for example, a case where the temperature of the first space W1 may be lowered below the target temperature lower limit value of the first space during the second storage chamber preferential cooling process M22.

If the fourth set time (for example, 15 minutes) elapses since the end of the first storage chamber preferential process, or the temperature of the first space W1 falls below the target temperature lower limit value of the first space W1, the natural defrosting and cooling process M23 may be started, and for this purpose, the first damper 191 may be opened, and the first fan 181 may be turned on.

In the natural defrosting and cooling process M23, the air of the second storage chamber C may be cooled by the second evaporator 160, and the air of the first space W1 may be moved to the first evaporator 150 to naturally defrost the first evaporator 150. In the natural defrosting and cooling process M23, since the refrigerant does not flow to the first evaporator 150, the first evaporator 150 may be defrosted by the air flowing in the first space W1. On the other hand, the air defrosting the first evaporator 150 may include moisture in the first evaporator 150, and the air may be discharged to the first space C1 to increase the humidity of the first space C1.

The deep cool mode M2 may end the natural defrosting and cooling process M23 at the end condition of the natural defrosting and cooling process M23. An example of an end condition of the natural defrosting and cooling process M23 may be a case where the first evaporator 150 exceeds a set temperature (for example, 5° C.).

Another example of the end condition of the natural defrosting and cooling process M23 may be a case where a fifth set time (for example, 80 minutes) elapses since the start of the natural defrosting and cooling process M23. Another example of the end condition of the natural defrosting and cooling process M23 may be a case where both the first space W1 and the second space W2 are in the heating mode during the natural defrosting and cooling process M23.

The natural defrosting and cooling process M23 may be ended if at least one of the above conditions is satisfied. The controller 30 may control the first damper 191 to be closed for this purpose and stop the first fan 181.

The deep cool mode M2 may further include a second storage chamber additional cooling process M24 for further cooling the second storage chamber. The controller 30 may perform the second storage chamber additional cooling process M24 after the natural defrosting and cooling process M23, control the first damper 191 to be closed, maintain the current state after stopping the first fan 181, and the refrigerator may further cool the second storage chamber C by the second storage chamber additional cooling process M24. The second storage chamber additional cooling process M24 may be ended when the end condition of the second storage chamber additional cooling process M24 is satisfied.

An example of the termination condition of the second storage chamber additional cooling process M24 may be a case where the temperature of the second storage chamber C is sufficiently lowered and a case where the temperature of the second storage chamber C is equal to or less than the deep cool end set temperature. The deep cool end set temperature may be set lower than a lower limit value of the second storage chamber target temperature and may be a temperature set lower by a set temperature (for example, 3° C.) than the lower limit value of the second storage chamber target temperature.

Another example of an end condition of the second storage chamber additional cooling process M24 may be a case where a sixth preset time (for example, 30 minutes) elapses since the start of the second storage chamber additional cooling process M24.

The controller 30 may end the second storage chamber additional cooling process M24 in a case where the temperature of the second storage chamber C is equal to or less than the deep cool end set temperature during the second storage chamber additional cooling process M24 or the sixth set time (for example, 30 minutes) elapses after the start of the second storage chamber additional cooling process M24.

The controller 30 may end the deep cool mode M2 after pumping down (P/D) the refrigerator in a case of the end condition of the deep cool mode M2 during the deep cool mode M2. The end condition of the deep cool mode M2 end condition may be the same as that of the second storage chamber additional cooling process M24.

In a case of the end condition of the second storage chamber additional cooling process M24, the controller 30 may turn on the compressor 100 and control the refrigerant valve 120 to be closed while the first fan 181 turns on, for pumping down (P/D), and, in this case, the refrigerant circulating in the refrigeration cycle may be collected between the refrigerant valve 120 and the second evaporator 160, in particular, between the refrigerant valve 120 and the compressor 100.

The controller 30 may stop the pump down after the pump down set time (for example, 5 minutes) elapses after the start of the pump down, turn off the compressor 100 to stop the pump down, turn off the first fan 181, and the deep cool mode M2 may be ended. The controller 30 may perform the second storage chamber additional cooling mode M3 in which the second evaporator 160 may further cool the second storage chamber C after the deep cool mode M2.

Hereinafter, the second storage chamber additional cooling mode M3 will be described. The controller 30 may keep the second fan 182 turned on when the compressor 100 is turned off, and air of the second storage chamber C may further cool the second storage chamber C while circulating between the second evaporator 160 and the second storage chamber C.

The second storage chamber additional cooling mode M3 may be ended in the end condition of the second storage chamber additional cooling mode M3. An example of the end condition of the second storage chamber additional cooling mode M3 may be a condition in which a seventh set time (for example, 5 minutes) elapses since the compressor 100 was turned off. After the controller 30 maintains the seventh set time after the compressor 100 is turned off, the controller 30 may turn off the second fan 181, and the second storage chamber additional cooling mode M3 may be ended.

The refrigerator may perform the defrost mode M4 after the additional storage mode M3 of the second storage chamber. The defrost mode M4 will be described below. The controller 30 may turn on the defrost heater 180 to defrost the second evaporator 160.

During the defrost mode M4, the controller 30 may turn on the first heater 171 to heat the first space W1 if the heating in the first space W1 is not satisfied and may turn off the first heater 171 if the heating in the first space W1 is satisfied. During the defrost mode M4, the controller 30 may turn on the second heater 172 to heat the second space W2 if the heating in the second space W2 is not satisfied, and may turn off the second heater 172 if the heating in the second space W2 is satisfied.

During the defrost mode M4, if the cooling in the first space W1 is not satisfied, the controller 30 may turn on the compressor 100 to cool the first space W1, control the refrigerant valve 120 in a first evaporator supply mode, control the first damper 191 in an opened mode, and turn on the first fan 181, and if the cooling in the first space W1 is satisfied, the controller 30 may close the first damper 191.

During the defrost mode M4, if the cooling in the second space W2 is not satisfied, the controller 30 may turn on the compressor 100 to cool the second space W2, control the refrigerant valve 120 in a second evaporator supply mode, control the second damper 191 in an opened mode, and turn on the first fan 181, and if the cooling in the second space W2 is satisfied, the controller 30 may close the second damper 192.

The defrost mode M4 may be ended if the end condition of the defrost mode M4 is satisfied. One example of the end condition of the defrost mode M4 may be a case where the temperature of the second evaporator 160 is increased to the defrost end temperature (for example, 5 degrees). Another example of the end condition of the defrost mode M4 may be a case where the defrost end time (for example, 120 minutes) elapses since the start of the defrost mode M4 (E).

After the start of the defrost mode M4, if the temperature of the second evaporator 160 is equal to or higher than the defrost end temperature (for example, 5 degrees) or the defrost end time (for example, 120 minutes) elapses, the controller 30 may end the defrost mode M4.

The controller 30 may turn off the defrost heater 180, and in this case, substantial defrost operation of the refrigerator may be ended. The refrigerator may perform a general operation (non-defrost operation) if the eighth set time (for example, 5 minutes) elapses after the end of the defrost operation, and an example of the general operation may be a case where the first storage chamber W and the second chamber C are alternately cooled. In this general operation, the controller 30 may first cool the second storage chamber C (shown as F operation in FIG. 16), and then alternately perform the first storage chamber cooling (shown as W operation in FIG. 16) and the second storage chamber cooling.

At the start of the second cooling operation of the general operation, the controller 30 may turn on the compressor 100 first, control the refrigerant valve 120 in the second evaporator mode, turn on the compressor 100, and then turn on the first fan 182 if the ninth set time (for example, 10 minutes) elapses, and, during the second storage chamber cooling, if the second storage chamber temperature is lower than the lower limit value of the second storage chamber target temperature, the controller 30 may perform the pump down, stop the pump down if the pump down set time (for example, 5 minutes) elapses after the pump down starts, and alternately perform the first storage chamber cooling and the second storage chamber cooling.

A refrigerator according to an embodiment of the present disclosure may include a cabinet configured to form a first storage chamber and a second storage chamber, a first evaporator configured to cool the first storage chamber, a first fan configured to circulate air in the first storage chamber to the first evaporator and the first storage chamber, a second evaporator configured to cool the second storage chamber, a compressor configured to be connected to the first evaporator and the second evaporator, a second fan configured to circulate air in the second storage chamber to the second evaporator and the second storage chamber, an adjusting valve configured to guide refrigerant to the first evaporator or the second evaporator; and a controller configured to perform a plurality of modes sequentially, in a case of a defrost condition.

The plurality of modes may include a second storage chamber pre-cool mode which cools the second storage chamber, a deep cool mode which cools the first storage chamber and the second storage chamber, a second storage chamber additional cooling mode which further cools the second storage chamber, and a defrost mode which defrosts the second evaporator. If the defrost condition is satisfied, the controller may perform the plurality of modes in the order of the second storage chamber pre-cool mode, the deep cool mode, the second storage chamber additional cooling mode, and the defrost mode.

The refrigerator may further include a partition member configured to partition the first storage chamber into a first space and a second space, in which the controller may perform a natural defrosting and cooling process which cools the second storage chamber while naturally defrosting the first space during the deep cool mode. The deep cool mode may include a first storage chamber preferential cooling process which cools the first storage chamber, a second storage chamber preferential cooling process which cools the second storage chamber, a natural defrosting and cooling process which cools the second storage chamber while naturally defrosting the first space; and a second storage chamber additional cooling process which further cools the second storage chamber.

The controller may perform the first storage chamber preferential cooling process during the deep cool mode and then perform the second storage chamber preferential cooling process. The controller may perform the natural defrosting and cooling process after performing the second storage chamber preferential cooling process.

The controller may perform a second storage chamber additional cooling process after performing the natural defrosting and cooling process. The refrigerator may further include a partition member configured to partition the first storage chamber into the first space and the second space, a first heater configured to heat the first space, and a second heater configured to heat the second space.

The controller may turn on and then turn off at least one of the first heater and the second heater according to the temperature of the first storage chamber during the dehumidification mode. According to an embodiment of the present disclosure, during the defrost operation, the defrost mode may be performed after cooling each of the first storage chamber and the second storage chamber so that the first storage chamber and the second storage chamber cannot be overheated during the defrost mode.

In addition, in the defrost operation, by cooling the second storage chamber first and then cooling the first storage chamber and the second storage chamber together, the second storage chamber may be cooled more reliably than a case where only the first storage chamber is cooled after cooling the second storage chamber. In addition, since the defrost mode is performed after the second storage chamber additional cooling mode is performed before the defrost mode, it may be possible to minimize overheating during the defrost mode of the second storage chamber than a case where the defrost mode is performed after the first storage chamber cooling.

In addition, in the deep cool mode, while cooling the second storage chamber, the first space may be naturally defrosted so that the humidity of the first space may be improved, and damage to the goods of the first space may be minimized. In addition, the first space and the second space may be heated during the dehumidification mode, so that the temperature of the first space and the second space may be adjusted to an optimum temperature.

In certain implementations, a refrigerator may comprise: a cabinet having a first storage chamber and a second storage chamber; a first evaporator configured to cool the first storage chamber; a first fan configured to circulate air between the first storage chamber and the first evaporator; a second evaporator configured to cool the second storage chamber; a compressor connected to the first evaporator and the second evaporator; a second fan configured to circulate air between the second storage chamber and the second evaporator; a refrigerant valve configured to guide refrigerant to at least one of the first evaporator or the second evaporator; a heater configured to heat the second evaporator; and a controller configured to control the first fan, and the second fan, the compressor, the refrigerant valve, and heater, wherein prior to turning on the heater to defrost the second evaporator, the controller performs: (1) a first operation to cool the second storage chamber; (2) a second operation to cool the first storage chamber and to further cool the second storage chamber; and (3) a third operation to further cool the second storage chamber.

In certain implementations, a refrigerator may comprise: a first storage chamber and a second storage chamber; a first evaporator configured to cool the first storage chamber; a first fan configured to circulate air between the first storage chamber and the first evaporator; a second evaporator configured to cool the second storage chamber; a compressor connected to the first evaporator and the second evaporator; a second fan configured to circulate air between the second storage chamber and the second evaporator; a valve configured to guide refrigerant to at least one of the first evaporator or the second evaporator; a heater configured to heat the second evaporator; and a controller configured to: turn on the compressor and the second fan and control the valve to guide refrigerant to the second evaporator during a first time period, turn on the compressor and the first fan and control the valve to guide refrigerant to the first evaporator during a second time period after the first time period, turn on the compressor and the second fan and control the valve to guide refrigerant to the second evaporator during a third time period after the second time period, wherein the first fan is turned on during a portion of the third time period, turn off the compressor and the first fan and turn on the second fan during a fourth time period after the third time period, and turn on the heater to defrost the second evaporator during a fifth time period after the fourth time period.

In certain implementations, a refrigerator may comprise: a refrigeration chamber and freezer chamber; a refrigeration system that includes a first heat exchanger to cool the refrigeration chamber, a second heat exchanger to cool the freezer chamber, and at least one fan; a heater configured to heat the second heat exchanger; and a controller configured to: operate the second heat exchanger to cool the freezer chamber during a first time period, operate the first heat exchanger to cool the refrigeration chamber during a second time period after the first time period, operate the second heat exchanger to further cool the freezer chamber during a third time period after the second time period, wherein the at least one fan is operated to circulate air between the first heat exchanger and the refrigeration chamber during a portion of the third time period, operate the at least one fan to circulate air between the second heat exchanger and the freezer chamber during a fourth time period after the third time period, and turn on the heater to defrost the second heat exchanger during a fifth time period after the fourth time period.

This application is also related to U.S. application Ser. No. 16/725,551, U.S. application Ser. No. 16/725,428, U.S. application Ser. No. 16/725,436, U.S. application Ser. No. 16/725,092, U.S. application Ser. No. 16/725,271, U.S. application Ser. No. 16/725,318, and U.S. application Ser. No. 16/725,166, the entire contents of which are hereby incorporated by reference.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
   a cabinet having a first storage chamber having a first target storage temperature and a second storage chamber having a second target storage temperature lower than the first target storage chamber;
   a first evaporator configured to cool the first storage chamber;
   a first fan configured to circulate air between the first storage chamber and the first evaporator;
   a second evaporator configured to cool the second storage chamber;
   a compressor connected to the first evaporator and the second evaporator;
   a second fan configured to circulate air between the second storage chamber and the second evaporator;
   a refrigerant valve configured to guide refrigerant to at least one of the first evaporator or the second evaporator;
   a heater configured to heat the second evaporator; and
   a controller configured to control the first fan, the second fan, the compressor, the refrigerant valve, and the heater,
   wherein when a defrost condition is satisfied while a cooling operation of the second storage chamber is performed, the controller delays a defrost operation of the second evaporator and firstly performs a first operation, a second operation and a third operation, prior to turning on the heater of the second evaporator:
   (1) the first operation to firstly cool the second storage chamber, wherein the controller turns on the compressor and the second fan, and controls the refrigerant valve so that the refrigerant is supplied to the second evaporator when performing the first operation;
   (2) the second operation to secondly cool the first storage chamber and to further cool the second storage chamber after completing the first operation; and
   (3) the third operation to further cool the second storage chamber after completing the second operation, and
   wherein the controller turns on the heater to defrost the second evaporator and performs the defrost operation of the second evaporator after completing the third operation.

2. The refrigerator of claim 1,
wherein the controller sequentially performs the first operation, the second operation, the third operation, and turns on the heater based on determining that a temperature of the second evaporator is below a threshold temperature or that at least a set length of time has passed since the second evaporator was previously defrosted.

3. The refrigerator of claim 1,
wherein the controller initiates the first operation based on determining that a defrost condition to defrost the second evaporator is satisfied while cooling the second storage chamber,
wherein the defrost condition is satisfied when a compressor on-accumulation time reaches a reference accumulation time, and
wherein the controller, when performing the first operation, turns on the compressor, turns on the second fan, and controls the refrigerant valve so that the refrigerant is supplied to the second evaporator.

4. The refrigerator of claim 1,
wherein the controller, during a portion of the second operation, performs a first process in which the compressor, the first fan, and the second fan are turned on while the refrigerant valve is controlled to supply the refrigerant to the second evaporator to cool the second storage chamber while defrosting the first evaporator.

5. The refrigerator of claim 4,
wherein the second operation further includes:
   a second process in which the compressor and the first fan are turned on while the refrigerant valve is controlled to supply the refrigerant to the first evaporator to cool the first storage chamber and not to supply the refrigerant to the second evaporator;
   a third process in which the compressor and the second fan are turned on and the first fan is turned off while the refrigerant valve is controlled to supply the refrigerant to the second evaporator to cool the second storage chamber; and
   a fourth process performed after the third process and in which the compressor and the second fan are turned on and the first fan is turned off while the refrigerant valve is controlled to supply the refrigerant to the second evaporator to further cool the second storage chamber.

6. The refrigerator of claim 5,
wherein the controller, during the second operation, performs the second process to cool the first storage chamber before performing the third process to cool the second storage chamber.

7. The refrigerator of claim 6,
wherein the controller ends the second process when a temperature in the first storage chamber is below a set temperature or after the compressor has been turned on for a first set time while the refrigerant valve is supplying refrigerant to the first evaporator.

8. The refrigerator of claim 5,
wherein the controller performs the first process after performing the third process.

9. The refrigerator of claim 8,
wherein the controller initiates the first process based on determining that the third process has been performed for a set time, or a temperature of the first storage chamber is lowered to a target temperature or less.

10. The refrigerator of claim 5,
wherein when performing the first process, the controller controls at least one damper when turning on the first fan to allow air circulation between the first evaporator and at least one space in the first storage chamber.

11. The refrigerator of claim 5,
wherein the controller performs the fourth process after performing the first process,
wherein after the fourth process is ended, the controller performs the third operation such that the controller keeps the second fan turned on when the compressor is turned off.

12. The refrigerator of claim 11, further comprising a partition configured to partition the first storage chamber into a first space and a second space,
wherein the controller is configured to end the third process and performs the first process when a set time has elapsed after the second process ends, or temperatures in the first and second spaces are both less than respective set temperatures.

13. The refrigerator of claim 12, further comprising:
a first storage chamber heater provided in the first storage chamber and configured to heat the first space and the second space, the first storage chamber heater including a first heater and a second heater,
wherein the controller is further to turn on the first heater to perform a first heating mode when the temperature of the first space is less than the set temperatures or the controller is further to turn on the second heater to perform a second heating mode when the temperature of the second space is less than a corresponding one of the set temperatures,
wherein when the first and the second heating modes are performed during the first process, the first process is ended.

14. The refrigerator of claim 1, further comprising:
a partition configured to partition the first storage chamber into a first space and a second space;
a first heater configured to heat the first space; and
a second heater configured to heat the second space,
wherein the controller turns on at least one of the first heater or the second heater when a temperature of the first storage chamber is less than a lower set temperature when the heater is turned on.

15. The refrigerator of claim 14, wherein when the heater is turned on,
the controller turns on the compressor and controls the refrigerant valve so that refrigerant is supplied to the first evaporator when the temperature in the first storage chamber is greater than an upper set temperature for the first storage chamber, and
the controller turns on the compressor and controls the refrigerant valve so that refrigerant is supplied to the second evaporator when the temperature in the second storage chamber is greater than a set temperature for the second storage chamber.

16. A refrigerator comprising:
a first storage chamber and a second storage chamber;
a first evaporator configured to cool the first storage chamber;
a first fan configured to circulate air between the first storage chamber and the first evaporator;
a second evaporator configured to cool the second storage chamber;
a compressor connected to the first evaporator and the second evaporator;
a second fan configured to circulate air between the second storage chamber and the second evaporator;
a valve configured to guide refrigerant to at least one of the first evaporator or the second evaporator;
a heater configured to heat the second evaporator; and
a controller configured to:
turn on the compressor and the second fan and control the valve to guide refrigerant to the second evaporator during a first time period,
turn on the compressor and the first fan and control the valve to guide refrigerant to the first evaporator during a second time period after the first time period,
turn on the compressor and the second fan and control the valve to guide refrigerant to the second evaporator during a third time period after the second time period, wherein the first fan is turned on during a portion of the third time period,
turn off the compressor and the first fan and turn on the second fan during a fourth time period after the third time period, and
turn on the heater to defrost the second evaporator during a fifth time period after the fourth time period,
wherein the controller, during the fifth time period when the heater is activated, is further to intermittently turn on the compressor and the first fan and control the valve to guide refrigerant to the first evaporator when a temperature in the first storage chamber is greater than a first set temperature and to intermittently turn on the compressor and the second fan and control the valve to guide refrigerant to the second evaporator when a temperature in the second storage chamber is greater than a second set temperature.

17. The refrigerator of claim 16, wherein the controller is further configured to turn off the compressor, the first fan, and the second fan between the first and second time periods.

18. The refrigerator of claim 16, further comprising a first storage chamber heater to heat the first storage chamber, wherein the controller is further to turn on the first storage chamber heater during the fourth time period when the temperature in the first storage chamber is below a set temperature.

19. A refrigerator comprising:
a refrigeration chamber and a freezer chamber;
a refrigeration system that includes
a first heat exchanger to cool the refrigeration chamber,
a second heat exchanger to cool the freezer chamber,
a compressor connected to the first heat exchanger and the second heat exchanger,
a first fan configured to circulate air between the refrigeration chamber and the first heat exchanger,
a second fan configured to circulate air between the freezer chamber and the second heat exchanger, and
a valve configured to guide refrigerant to at least one of the first heat exchanger or the second heat exchanger;
a defrosting heater configured to heat the second heat exchanger; and
a controller configured to control the first fan, the second fan, the compressor, the valve, and the defrosting heater, wherein when a defrost condition is satisfied while a cooling operation of the second storage chamber is performed, the controller delays a defrost operation of the second heat exchanger and firstly performs a predetermined operation, prior to turning on the heater to perform the defrost operation of the second heat exchanger, the predetermined operation including:

a first operation in which the compressor and the second fan are turned on and the valve guides the refrigerant to the second heat exchanger to cool the freezer chamber during a first time period, a second operation in which the compressor and the first fan are turned on and the valve guides the refrigerant to the first heat exchanger to cool the refrigeration chamber during a second time period after the first time period, a third operation in which the compressor and the second fan are turned on and the valve guides the refrigerant to the second heat exchanger, not to the first heat exchanger to further cool the freezer chamber during a third time period after the second time period, wherein the first fan is operated to circulate air between the first heat exchanger and the refrigeration chamber during a portion of the third time period to defrost the first heat exchanger.

20. The refrigerator of claim 1, wherein when a temperature of the second storage chamber is satisfied during the first operation or when a set time elapses after the start of the first operation, the first operation is ended after a pump down operation (P/D) in which the controller controls the refrigerant valve to a closed mode while the compressor and the second fan remain turned on, to allow the refrigerant to be collected between the refrigerant valve and the compressor.

21. The refrigerator of claim 20, wherein the controller turns off the compressor and the second fan to stop the pump down operation after a pump down set time elapses, and the first operation is ended after the pump down is stopped.

22. The refrigerator of claim 19, wherein the predetermined operation further includes:

a fourth operation in which the compressor and the second fan are turned on and the valve guides the refrigerant to the second heat exchanger during a fourth time period after the third time period, and wherein the defrost operation is performed during a fifth time period after the fourth time period.

23. The refrigerator of claim 19, wherein the refrigeration chamber includes a first space provided with a first heater and a second space provided with a second heater, wherein the controller is configured to turn on the first heater to perform a first heating mode when the temperature of the first space is less than a set temperature, and the controller is further to turn on the second heater to perform a second heating mode when the temperature of the second space is less than the set temperature, and wherein when at least one of the first heating mode or the second heating mode is performed during the third time period, the third operation is ended.

* * * * *